US011836401B2

(12) United States Patent
Kawaguchi et al.

(10) Patent No.: US 11,836,401 B2
(45) Date of Patent: Dec. 5, 2023

(54) NON-TRANSITORY COMPUTER-READABLE STORAGE MEDIUM STORING A PROGRAM FOR EXECUTION BY A COMPUTER OF AN INFORMATION PROCESSING DEVICE CAPABLE OF COMMUNICATING WITH A PRINTER

(71) Applicant: BROTHER KOGYO KABUSHIKI KAISHA, Nagoya (JP)

(72) Inventors: Masafumi Kawaguchi, Nagoya (JP); Hirotaka Kubota, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 17/578,346

(22) Filed: Jan. 18, 2022

(65) Prior Publication Data

US 2022/0137891 A1 May 5, 2022

Related U.S. Application Data

(63) Continuation of application No. PCT/JP2020/027350, filed on Jul. 14, 2020.

(30) Foreign Application Priority Data

Jul. 19, 2019 (JP) ................................. 2019-134187

(51) Int. Cl.
*G06F 3/12* (2006.01)
*G06F 3/04817* (2022.01)
(Continued)

(52) U.S. Cl.
CPC ............ *G06F 3/1219* (2013.01); *B41J 29/38* (2013.01); *G06F 3/04817* (2013.01);
(Continued)

(58) Field of Classification Search
None
See application file for complete search history.

(56) References Cited

U.S. PATENT DOCUMENTS

2017/0070642 A1 3/2017 Miyamoto et al.

FOREIGN PATENT DOCUMENTS

EP 3373074 A1 * 9/2018 .......... B41M 7/0009
JP 2004-272670 A 9/2004
(Continued)

OTHER PUBLICATIONS

English translation of JP-2005349704-A. (Year: 2005).*
(Continued)

*Primary Examiner* — Thomas D Lee
(74) *Attorney, Agent, or Firm* — KENEALY VAIDYA LLP

(57) ABSTRACT

An information processing device can communicate with a printer and a server. The printer includes a printing unit which carries out printing on a sheet with using a colorant. The server includes a server memory unit which stores user identification information and a print-permitted amount of printing permitted for a user in association with those. When a program is executed by a computer of the information processing device, the program causes the information processing device to perform display processing of displaying, a display unit of the information processing device, a selection screen for prompting the user to select a printing amount, and addition processing of, in response to a user's operation of the selection screen, causing the server to add the selected printing amount to the print-permitted amount associated with the user identification information of the user.

12 Claims, 18 Drawing Sheets

(51) Int. Cl.
*G06K 15/10* (2006.01)
*B41J 29/38* (2006.01)

(52) U.S. Cl.
CPC .......... *G06F 3/1222* (2013.01); *G06F 3/1229* (2013.01); *G06F 3/1238* (2013.01); *G06F 3/1253* (2013.01); *G06F 3/1288* (2013.01); *G06K 15/102* (2013.01)

(56) References Cited

FOREIGN PATENT DOCUMENTS

| JP | 2005349704 A | * 12/2005 | ............ G06K 15/00 |
|----|--------------|-----------|------------------------|
| JP | 2007-109159 A | 4/2007 | |
| JP | 2012-187930 A | 10/2012 | |
| JP | 2015-232814 A | 12/2015 | |
| JP | 2018-30375 A | 3/2018 | |

OTHER PUBLICATIONS

International Search Report for PCT/JP2020/027350 dated Aug. 25, 2020.
International Preliminary Report On Patentability for PCT/JP2020/027350 dated Jan. 25, 2022 and Written Opinion of the International Search Report for PCT/JP2020/027350 dated Aug. 25, 2020.

* cited by examiner

FIG. 17

| KT2 | (OLD DEVICE) | (NEW DEVICE) |
|---|---|---|
| DEVICE ID | dv2 | dv3 |
| SERVICE ID | sv2 | sv2 |
| INK LEVEL | ink2 | ink3 |
| REPLACEMENT APPLICATION INFORMATION | ○ | × |
| ACTIVATION INFORMATION | ○ | × |
| DEVICE REPLACEMENT INFORMATION | × | × |
| DEVICE SETTING | dc2 | dc3 |

NON-TRANSITORY COMPUTER-READABLE STORAGE MEDIUM STORING A PROGRAM FOR EXECUTION BY A COMPUTER OF AN INFORMATION PROCESSING DEVICE CAPABLE OF COMMUNICATING WITH A PRINTER

CROSS-REFERENCE TO RELATED APPLICATION

This is a continuation application of International Application No. PCT/JP2020/027350 filed on Jul. 14, 2020 which claims the benefit of priority from Japanese patent application No. 2019-134187 filed on Jul. 19, 2019. The entire contents of the earlier applications are incorporated herein by reference.

TECHNICAL FIELD

The present disclosure relates to a technology of a printing system for a printing service.

BACKGROUND

JP-A-2004-272670 and JP-A-2007-109159 disclose a printing system whereby a printing service can be continuously used by paying a fixed fee for a predetermined period.

In the above-mentioned printing system, there occurs variation in number of sheets that are used for printin within the predetermined period, so that there occurs variation in actual fee for printing.

SUMMARY

An object of the present disclosure is to provide a technology whereby a printin service can be continuously used as appropriate according to the number of sheets used for printing.

An aspect of the present disclosure is an non-transitory computer-readable storage medium storing a computer program, when executed by a computer of an information processing device capable of communicating with a printer including a printing unit configured to carry out printing on a sheet with using a colorant, and a server including a server memory unit configured to store user identification information for identifying a user and a print-permitted amount of printing permitted for the user in association with the user identification information, the computer program being configured to cause the information processing device to perform:

first display processing of displaying, on a display unit of the information processing device, a selection screen for prompting a user to select a printing amount; and addition processing of, in response to a user's operation of the selection screen displayed in the first display processing to select a predetermined printing amount, causing the server to add the selected printing amount to the print-permitted amount associated with the user identification information of the user.

According to the above aspect, it is possible to continuously use the printing service as appropriate according to the number of sheets used for printing.

BRIEF DESCRIPTION OF DRAWINGS

FIG. 17 illustrates a device management table in which information of an old device and a new device before the flowchart of the device replacing processing shown in FIG. 15 is performed are set.

DETAILED DESCRIPTION (Configuration of Printing System 1)

Figure 1:
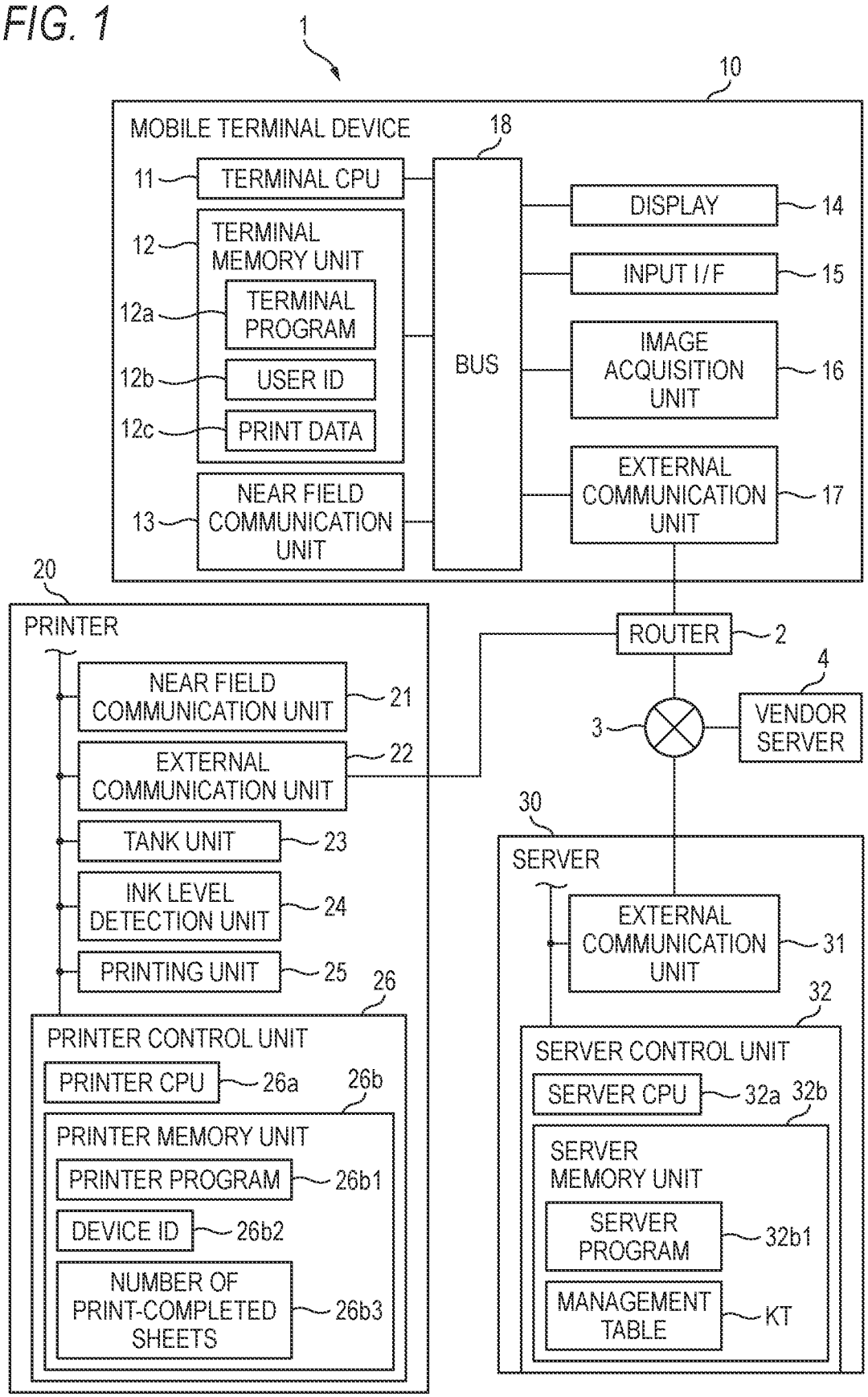
FIG. 1 is a configuration view of a printing system according to an embodiment of the present disclosure.

FIG. 1 is a configuration view of a printing system 1 according to an embodiment of the present disclosure. The printing system 1 is used for a printing service that is provided to a user. The printing service is a service that enables the user to perform printing by the user paying charging for a number of printable sheets, which is a number of sheets to be used for printing that is carried out by a printer 20. In the present embodiment, the printer 20 is an inkjet printer.

When the user pays the initial cost at the time of applying for the printing service, the user is given with a predetermined number of printable sheets (for example, 2,000 sheets) and the printer 20 in which ink is sufficiently filled is delivered from a vendor to the user.

The printer 20 that is delivered from the vendor to the user is filled with an amount of ink required to carry out printing of the predetermined number of printable sheets or more (for example, 2,000 sheets+α sheets) given to the user. Therefore, in the present printing service, after the user gets the printer 20 until the user carries out printing of the number of printable sheets given by paying the initial cost, it is not necessary for the user to fill the ink in the printer 20 or to replace an ink cartridge. Therefore, the present printing service is a service that is highly convenient to the user because it is not necessary to replenish ink to the printer 20. In addition, when the user wants to perform printing beyond the predetermined number of printable sheets given by payment of the initial cost, the user can continue to use the printer 20 by purchasing an additional number of printable sheets by paying an additional cost. In a case where a remaining amount of ink in the printer 20 gotten by payment of the initial cost becomes small as a result of the user repeating the purchase of the additional number of printable sheets, the printer 20 is replaced by the user applying for replacement of the printer 20, so that the printing service is continued. Note that, the α sheets are a number of sheets that is appropriately set by the vendor that provides the printing service.

The printing system 1 includes a mobile terminal device 10, the printer 20 and a server 30. The mobile terminal device 10 and the printer 20 are communicatively connected to each other via a router 2 in a wired or wireless manner. In addition, the mobile terminal device 10 and printer 20 and the server 30 are communicatively connected to each other via the router 2 and the Internet 3.

(Configuration of Mobile Terminal Device 10)

The mobile terminal device 10 is communicatively provided with the printer 20 and the server 30 and is configured to cause the printer 20 to carry out printing of an image on a sheet. The mobile terminal device 10 is a mobile phone (more specifically, a smart phone) that is possessed by the user. The mobile terminal device 10 includes a terminal CPU 11, a terminal memory unit 12, a near field communication unit 13, a display 14, an input interface 15, an image acquisition unit 16 and an external communication unit 17. These constitutional elements can communicate with each other via a bus 18. Hereinafter, the interface is denoted as 'I/F'.

The terminal CPU 11 is configured to execute processing, according to a terminal program 12a in the terminal memory unit 12. The terminal program 12a is a program configured to execute a variety of processing such as print processing.

The terminal memory unit 12 is configured by a combination of a RAM (abbreviation of Random Access Memory), a ROM (abbreviation of Read Only Memory), an HDD (abbreviation of Hard Disk Drive), a buffer provided to the terminal CPU 11, and the like. In the terminal memory unit 12, a user ID 12b and print data 12c are stored. The user ID 12b is to identify a user. The print data 12c is data converted from a target image, which is a target of the print processing, into a data format that can be interpreted by the printer 20.

The near field communication unit 13 is configured to wirelessly communicate with the printer 20 at a short distance. The near field communication unit 13 is configured to perform two-way wireless communication with a near field communication unit 21 of the printer 20, which will be described later, by NFC, for example. The display 14 is configured to display various screens, and examples thereof include, but not limited thereto, an LCD (abbreviation of Liquid Crystal Display), an organic EL (abbreviation of Electro Luminescence) display 14 and the like. The input I/F 15 may be a touch panel integrated with the display 14, and is configured to receive a user operation on an icon and the like displayed on the display 14. The input I/F 15 may also be a keyboard, a mouse and the like. The keyboard includes keys for executing each function of the mobile terminal device 10. The mouse is configured to operate a pointer (not shown) displayed on the display 14.

The image acquisition unit 16 is configured to acquire a target image. The image acquisition unit 16 is configured to acquire, as the target image, an image captured by a camera (not shown) provided to the mobile terminal device 10, for example. The image acquisition unit 16 may also be connected to an HDD or the like corresponding to an external device to acquire the target image. The target image acquired by the image acquisition unit 16 is converted into print data 12c and stored in the terminal memory unit 12. The external communication unit 17 is configured to transmit and receive a signal to and from an external apparatus (in the present embodiment, the printer 20 and the server 30) connected via a network. The external communication unit 17 is connected to the printer 20 via the router 2. The external communication unit 17 is also connected to the server 30 via the router 2 and the Internet 3.

(Configuration of Printer 20)

The printer 20 is a color printing machine, in the present embodiment. The printer 20 includes a near field communication unit 21, an external communication unit 22, a tank unit 23, an ink level detection unit 24, a printing unit 25 and a printer control unit 26.

The near field communication unit 21 is configured to perform wireless communication with the mobile terminal device 10 at a short distance with using NFC, for example. The external communication unit 22 is configured to transmit and receive a signal to and from an external apparatus (in the present embodiment, the mobile terminal device 10 and the server 30) connected via the network.

The tank unit 23 is configured to reserve ink. In the present embodiment, there are four types of inks (magenta M, cyan C, yellow Y and black BK), and a plurality of tank units 23 is provided for each type of the inks. That is, the printer 20 is configured to independently reserve each of the four types of inks with using the plurality of tank units 23. Note that, in the present embodiment, when the printer 20 is supplied from the vendor to the user, each of the plurality of tank units 23 is filled with an amount of ink capable of printing a predetermined number of sheets in a case where a single color coverage is set to 5%. The predetermined number of sheets is a number of sheets larger than the number of printable sheets that is given to the user who applies for the printing service, and can be appropriately set by the vendor that provides the printing service.

In addition, the tank unit 23 is provided so that the user cannot charge ink. Specifically, the tank unit 23 is arranged in a position that cannot be contacted by the user. Furthermore, the tank unit 23 is non-detachably fixed to the printer 20.

The ink level detection unit 24 is configured to detect an ink level that is a remaining amount of ink reserved in the tank unit 23. The ink level detection unit 24 is an optical sensor arranged in the tank unit 23 and configured to detect an ink level by detecting a height of a liquid level of ink. The ink level detection unit 24 is arranged in each of the plurality of tank units 23, and is configured to detect an ink level in each of the plurality of tank units 23.

The printing unit 25 is configured to carry out printing with using the ink reserved in the tank unit 23. The printing unit 25 is configured to execute processing for printing, on a sheet, an image expressed by data acquired from an outside by a well-known inkjet method. The data acquired from the outside is the print data 12c stored in the terminal memory unit 12, in the present embodiment.

The printer control unit 26 is configured to collectively control the printer 20. The printer control unit 26 includes a printer CPU 26a and a printer memory unit 26b. The printer CPU 26a is configured to execute processing according to a printer program 26b1 in the printer memory unit 26b. The printer program 26b1 is a program configured to execute a variety of processing. The printer memory unit 26b is configured by a combination of a RAM, a ROM, a flash memory, an HDD, a buffer provided to the printer CPU 26a, and the like. In the printer memory unit 26b, a device ID 26b2 and a number of print-completed sheets 26b3 are also stored.

The device ID 26b2 is to identify the printer 20. The number of print-completed sheets 26b3 is one obtained by adding up a number of sheets actually used for printing carried out by the printing unit 25 as communication cannot be performed between the printer 20 and the server 30. A state where communication cannot be performed between the printer 20 and the server 30 occurs when the network such as the Internet 3 is disconnected or when a failure occurs in the external communication unit 17. Note that, the number of print-completed sheets 26b3 is zero in a state where the printer 20 and the server 30 are connected to each other.

(Configuration of Server 30)

The server 30 includes an external communication unit 31 and a server control unit 32.

The external communication unit 31 is configured to transmit and receive a signal to and from an external apparatus (in the present embodiment, the mobile terminal device 10 and the printer 20) connected via the network.

The server control unit 32 is configured to collectively control the server 30. The server control unit 32 includes a server CPU 32a and a server memory unit 32b. The server CPU 32a is configured to execute processing according to a server program 32b1 in the server memory unit 32b. The server program 32b1 is a program configured to execute a variety of processing.

Figure 2:
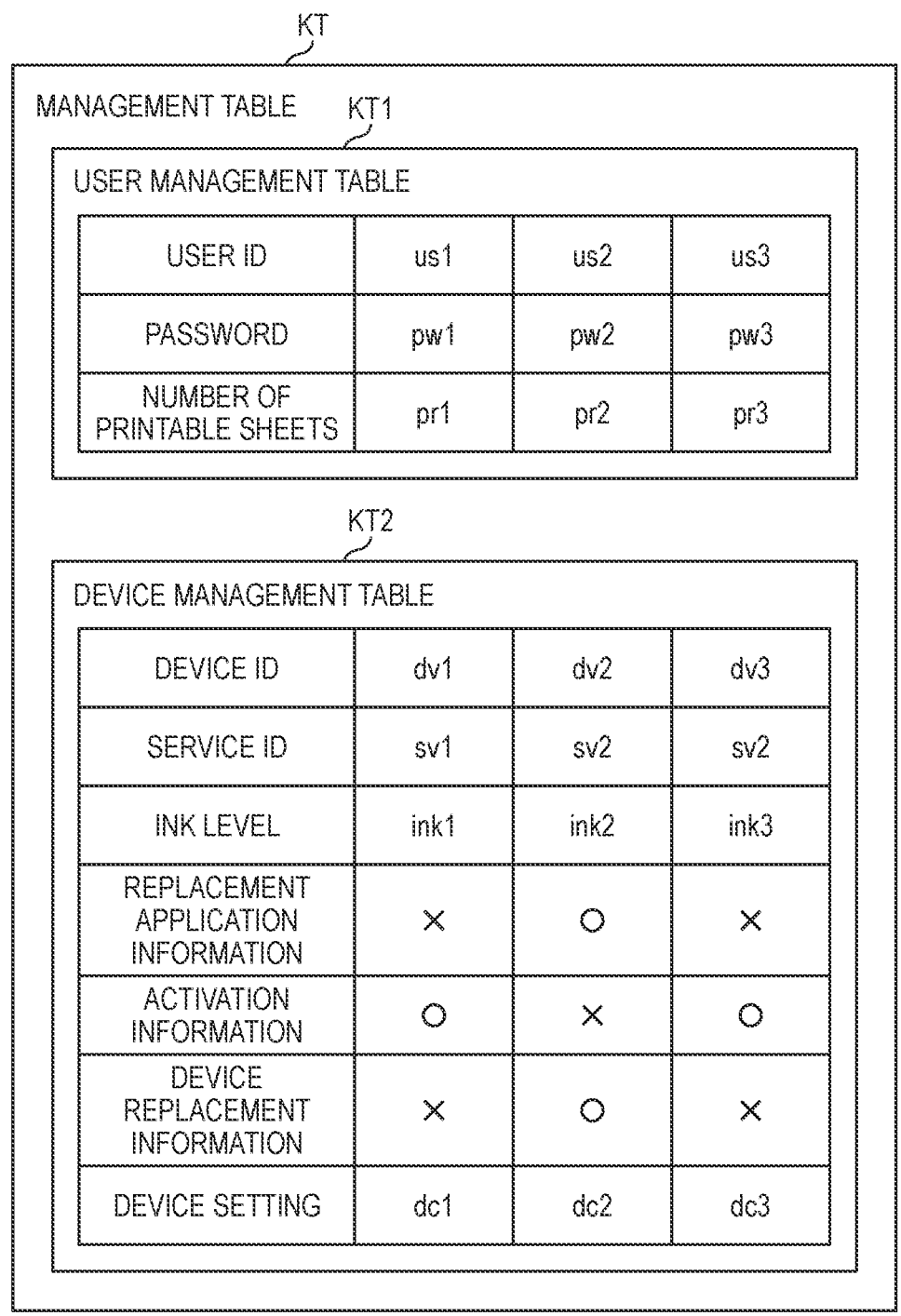
FIG. 2 illustrates a management table shown in FIG. 1.

The server memory unit 32b is configured by a combination of a RAM, a ROM, a flash memory, an HDD, a buffer provided to the server CPU 32a, and the like. In the server memory unit 32b, a management table KT is also stored. As shown in FIG. 2, the management table KT is a table in which information required at the time of using the printing service is stored. The information stored in the management table KT is appropriately used when a variety of processing, which will be described later, is performed. The management table KT has a user management table KT1 and a device management table KT2.

The user management table KT1 is a table in which information about users is stored. In the user management table KT1, a user ID 12b, a password and a number of printable sheets are stored in association with those. The password is used at the time when the user uses the terminal program 12a.

The number of printable sheets indicates a number of sheets by which printing can be carried out by the printer 20. The user can perform printing by the number of printable sheets stored in the user management table KT1. When charging is paid by the user, a number of sheets corresponding to the charged amount is added to the number of printable sheets. On the other hand, a number of sheets used by printing in the printer 20 is subtracted from the number of printable sheets. The addition and subtraction of the number of printable sheets will be described in detail later.

The device management table KT2 is a table in which information about devices is stored. In the device management table KT2, a device ID 26b2, a service ID, an ink level, replacement application information, activation information, device replacement information and a device setting are stored in association with those.

The service ID is to identify the printing service. The ink level indicates an ink level detected by the ink level detection unit 24. The replacement application information indicates that replacement of the printer 20 has been already applied when the replacement application information is set to an ON state and replacement of the printer 20 has not been applied when the replacement application information is set to an OFF state. Note that, 'O' in FIG. 2 indicates the setting of the ON state, and 'X' indicates the setting of the OFF state.

The activation information indicates that by the printing unit 25 is permitted to carry out printing when the activation information is set to an ON state and the printing unit 25 is restricted from carrying out printing when the activation information is set to an OFF state. The activation information can be set to the ON state only for one printer with respect to one service ID.

The device replacement information indicates whether the printer 20 has been replaced. The device replacement information indicates that the printer is a printer already replaced when the device replacement information is set to an ON state and the printer is a printer not replaced yet when the device replacement information is set to an OFF state.

The device setting indicates functions (copy, scan and the like) of the printer 20 and settings (a sheet size, a color, a magnification and the like) of each function.

(Initial Setting Processing)

Subsequently, a variety of processing that is performed by the terminal CPU 11 is described. First, initial setting processing is described using a flowchart shown in FIG. 3. The initial setting processing is setting processing of a user that is performed by the user so as to start use of a printing service at the time when the user applies for the printing service and the printer 20 is first delivered from the vendor to the user. Note that, as described above, when the printer 20 is delivered, a predetermined number of printable sheets (for example, 2,000 sheets) is given thereto.

The initial setting processing is started, in response to the terminal program 12a being activated in a state where a user is not registered, in a state where a power supply of the printer 20 becomes on and the printer 20 and the mobile terminal device 10 are communicatively connected.

In S100, the terminal CPU 11 displays a user registering screen (not shown) on the display 14. The user registering screen is a screen for setting a user ID 12b and a password. In S102, the terminal CPU 11 determines whether a user registering operation has been performed. The user registering operation is to input a user ID 12b and a password by the user. When the user ID 12b and the like have not been input, the terminal CPU 11 determines NO in S102, and repeatedly executes S102. On the other hand, when the user inputs the user ID 12b and the like with using the input I/F 15, the terminal CPU 11 determines YES in S102, and executes user registering processing in S104. The user registering processing is processing of storing the user ID 12b and the password in the user management table KT1.

Figure 4:
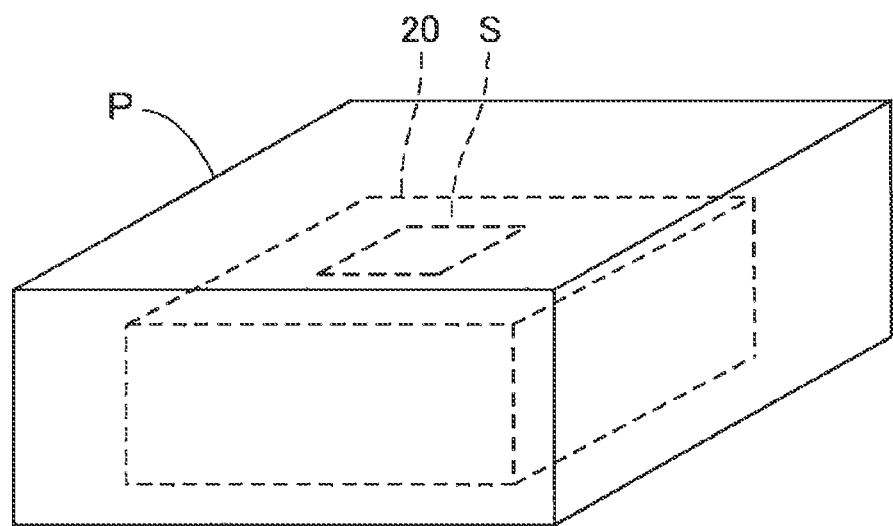
FIG. 4 shows a packing box for a printer that is delivered from a vendor.

Subsequently, in S106, the terminal CPU 11 displays a number-of-printing sheets setting screen (not shown) on the display 14. The number-of-printing sheets setting screen is a screen for storing, in the user management table KT1, the predetermined number of printable sheets given at the time when the printer 20 is delivered. In the present embodiment, on the number-of-printing sheets setting screen, it is displayed that a two-dimensional code such as a QR code (registered trademark), for example, is to be read. The two-dimensional code is printed on a sheet S put together with the printer 20 in a packing box P delivered from the vendor (FIG. 4).

In addition, in S108, it is determined whether a number-of-printing sheets operation has been performed. The number-of-printing sheets setting operation is a user operation of reading the two-dimensional code. When the two-dimensional code has not been read, the terminal CPU 11 determines NO in S108, and repeatedly executes S108. On the other hand, when the two-dimensional code has been read, the terminal CPU 11 determines YES in S108, and proceeds to S110.

In S110, the terminal CPU 11 executes number-of-printing sheets setting processing. The number-of-printing sheets setting is processing of storing, in the user management table KT1, the predetermined number of printable sheets given to the user as a result of the application of the printing service. In other words, the two-dimensional code is configured to execute the number-of-printing sheets setting processing.

Subsequently, in S112, the terminal CPU 11 executes initial device setting processing. The initial device setting processing is setting processing of a device that is performed by the user so as to start use of the printing service. The initial device setting processing is described using a flowchart shown in FIG. 5.

In S200, the terminal CPU 11 displays a device discovery button (not shown) on the display 14. The device discovery button is a button for starting device discovery processing. Subsequently, in S202, the terminal CPU 11 determines whether a device discovery operation has been performed. The device discovery operation is a user operation on the device discovery button. When the user has not operated the device discovery button, the terminal CPU 11 determines NO in S202, and repeatedly executes S202. On the other hand, when the user has operated the device discovery button, the terminal CPU 11 determines YES in S202, and performs device discovery processing in S204. The device discovery processing is processing of discovering a printer connected to a network to which the mobile terminal device 10 belongs.

Subsequently, in S206, the terminal CPU 11 determines whether there is a response (which will be described later) from a device (printer) within a predetermined time (for example, 30 seconds). When the predetermined time elapses in a state where there is no response from the printer because the printer is not connected to the network, or the like, the terminal CPU 11 determines NO in S206, and ends the initial device setting processing.

Figure 7A:
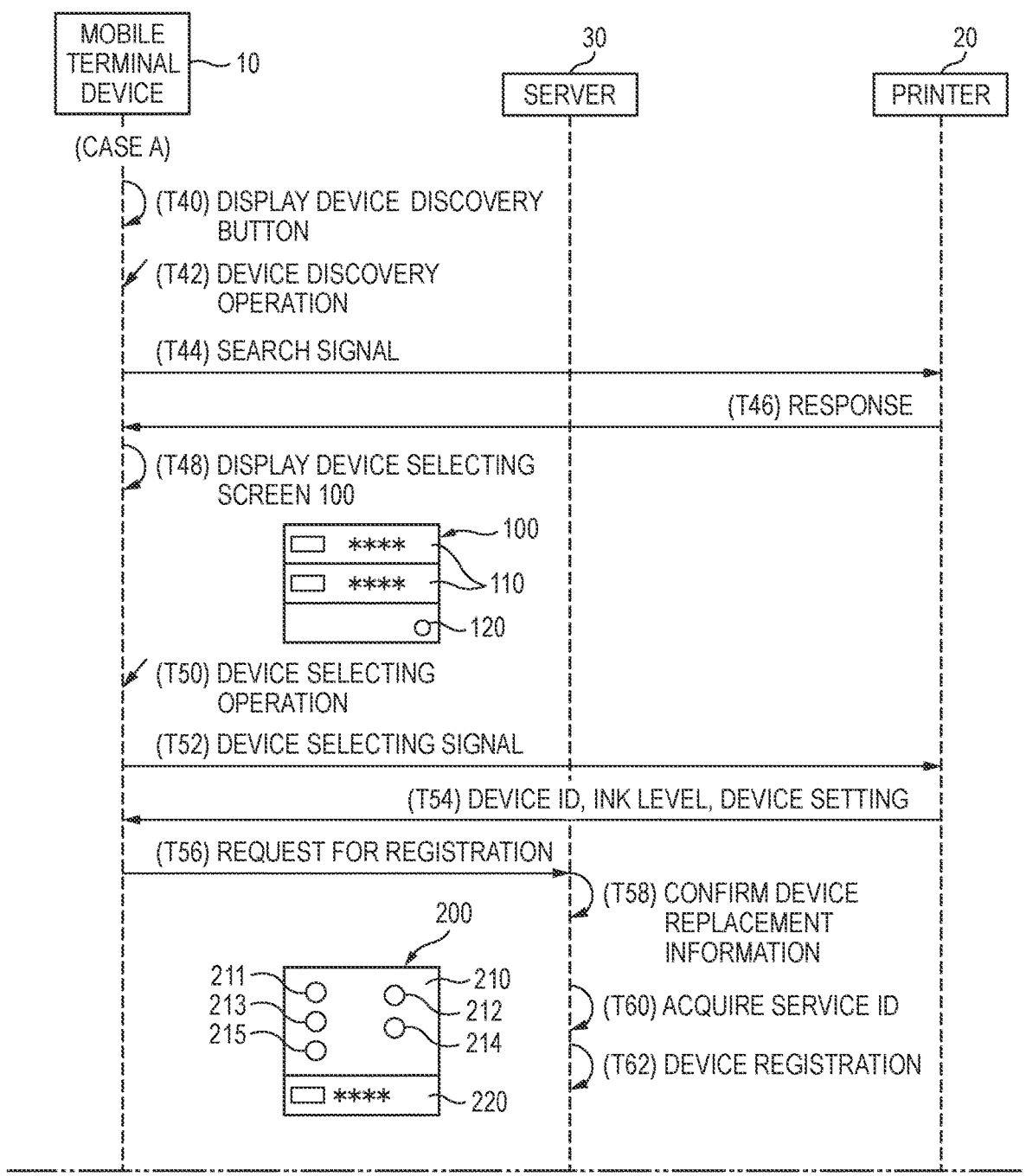
FIGS. 7A and 7B show a sequence diagram when the initial device setting processing shown in FIG. 5 is performed.
Figure 7B:
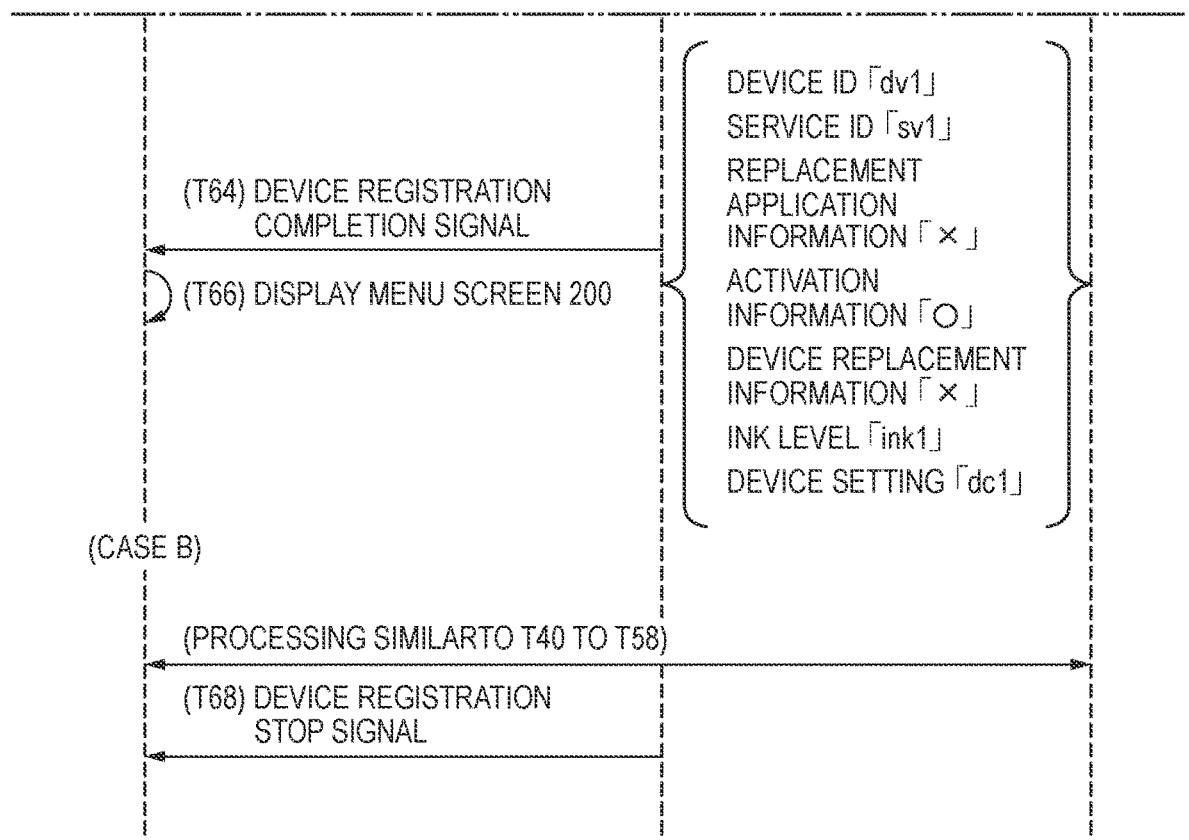

On the other hand, when there is a response from the printer connected to the network within the predetermined time, the terminal CPU 11 determines YES in S206, and displays a device selecting screen 100 on the display 14 in S208 (FIGS. 7A and 7B).

The device selecting screen 100 is a screen for receiving selection of any printer from printers discovered as a result of the device discovery. In the device selecting screen 100, the discovered printers are displayed in a plurality of display fields 110 in a list form divided for each device (FIGS. 7A and 7B).

In the present embodiment, the printer 20 connected to the mobile terminal device 10 via the router 2 is detected.

Subsequently, in S210, the terminal CPU 11 determines whether a device selecting operation has been performed. The device selecting operation is a user operation of selecting any printer in the device selecting operation 100. When a printer is not selected by the user, the terminal CPU 11 determines NO in S210, and repeatedly executes S210. On the other hand, when a printer is selected by the user, the terminal CPU 11 determines YES in S210, and performs device information registering processing in S212. The device information registering processing is processing of storing each item of the device management table KT2 (which will be described in detail later).

(Operations of Printing System 1 in Initial Setting Processing)

Figure 6:
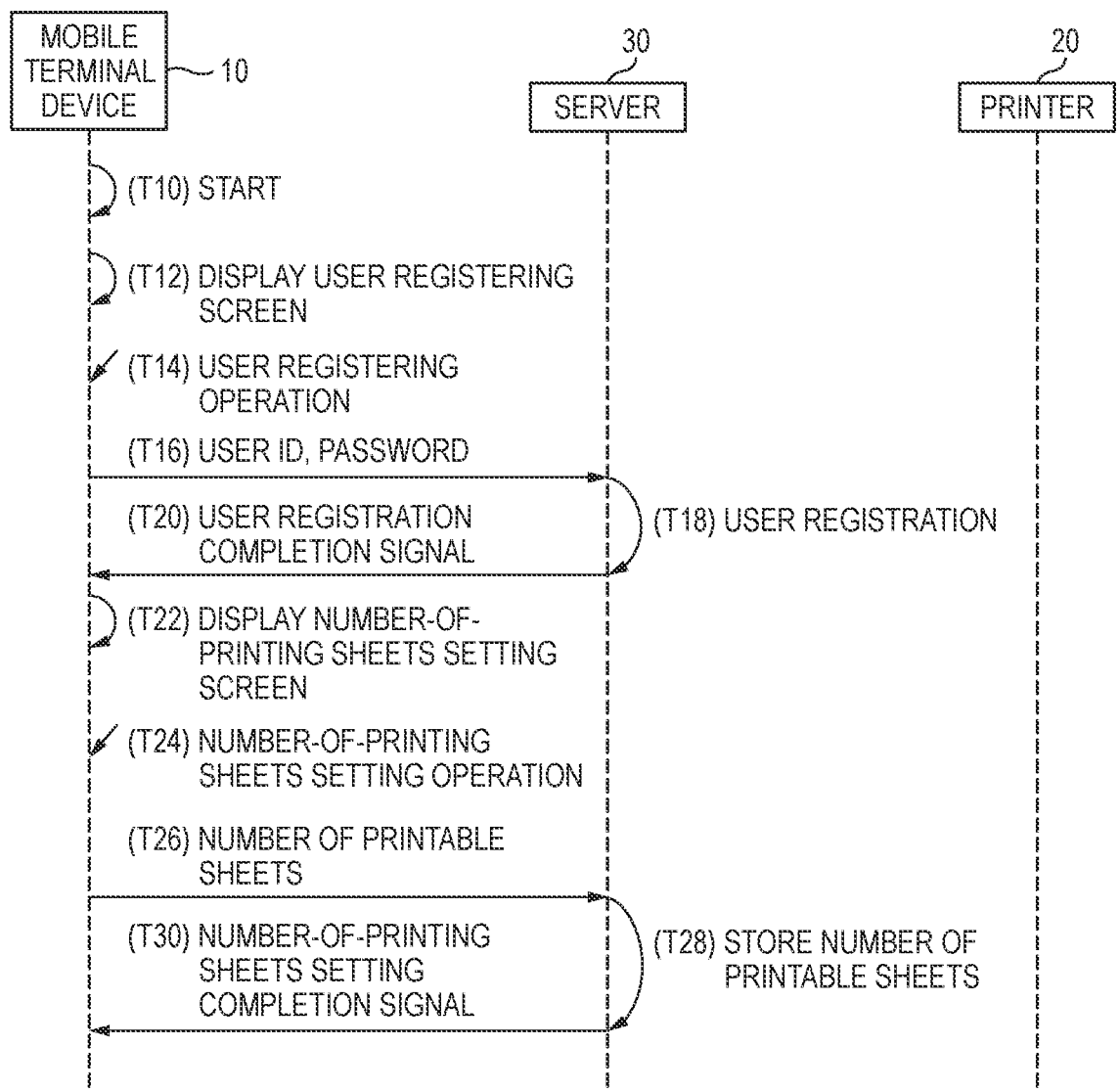
FIG. 6 is a sequence diagram when the flowchart of the initial setting processing shown in FIG. 3 is performed.

Subsequently, as for operations of the printing system 1 that are performed when the above-described initial setting processing is performed, a case where a user who sets a user ID 12b to 'us1' and a password to 'pw1' initially sets a printer 20 having a device ID 26b2 'dv1' is described using a sequence diagram shown in FIG. 6.

In T10, the mobile terminal device 10 activates the terminal program 12a, in response to receiving a user's operation. In T12, the mobile terminal device 10 displays the user registering screen (S100). Subsequently, in T14, the mobile terminal device 10 receives a user registering operation (YES in S102). Specifically, the user ID 12b 'us1' and the password 'ps1' are input by the user on the user registering screen. The mobile terminal device 10 executes the user registering processing, in response to receiving the user's registering operation (S104). Specifically, in T16, the mobile terminal device 10 transmits the user ID 12b and the password input by the user to the server 30 via the Internet 3.

In T18, the server 30 executes user registration, in response to receiving the user ID 12b and the like. Specifically, the server 30 stores the user ID 12b and the password in the user management table KT1 (FIG. 2). In T20, the server 30 transmits a user registration completion signal, which indicates that the user registration has been completed, to the mobile terminal device 10, in response to storing the user ID 12b and the like.

In T22, the mobile terminal device 10 displays the number-of-printing sheets setting screen, in response to receiving the user registration completion signal (S106). Also, in T24, the mobile terminal device 10 receives the number-of-printing sheets setting operation, in response to the two-dimensional code being read by the user (YES in S108). In T26, the mobile terminal device 10 executes the number-of-printing sheets setting processing, in response to receiving the number-of-printing sheets setting operation (S110). Specifically, the mobile terminal device 10 transmits a signal, which indicates the predetermined number of printable sheets ('pr1', in the present embodiment), to the server 30.

In T28, the server 30 stores the number of printable sheets 'pr1' and the user ID 12b in the user management table KT1 in association with those, in response to receiving the signal indicative of the predetermined number of printable sheets (FIG. 2). In T30, the server 30 transmits a number-of-printing sheets setting completion signal, which indicates that the storing of the number of printable sheets has been completed, to the mobile terminal device 10, in response to storing the number of printable sheets. The mobile terminal device 10 executes the initial device setting processing, in response to receiving the number-of-printing sheets setting completion signal (S112).

(Case A)

Subsequently, as for operations of the printing system 1 that are performed when the above-described initial device setting processing is performed in Case A, a case of setting a service ID 'sv1' is described using a sequence diagram shown in FIGS. 7A and 7B. Case A is a case where a printer is first delivered from the vendor to the user and a printer, which is a target of the initial device setting processing, has not been replaced yet. In this case, the device management table KT2 is in a blank state where nothing is set.

In T40, the mobile terminal device 10 displays the device discovery button (S200). Subsequently, in T42, the mobile terminal device 10 receives a device discovery operation (YES in S202). In T44, the mobile terminal device 10 transmits a search signal to the network, in response to receiving the device discovery operation. In T46, the mobile terminal device 10 receives a response to the search signal from the printer 20. The response includes a printer name of the printer 20. In T48, the mobile terminal device 10 displays the device selecting screen 100 (S208), in response to receiving the response within a predetermined time (YES in S206). In the device selecting screen 100, the printer name of the printer 20 having responded is displayed. In the present embodiment, only the printer 20 is displayed in the device selecting screen 100.

In T50, the mobile terminal device 10 receives a device selecting operation (YES in S210). In T52, the mobile terminal device 10 transmits a device selecting signal, which indicates that the device is selected, to the printer 20, in response to receiving the device selecting operation. In T54, the printer 20 transmits a signal, which indicates a device ID 26b2 'dv1', an ink level 'ink1' and a device setting 'dc1', to the mobile terminal device 10, in response to receiving the device selecting signal.

In T56, the mobile terminal device 10 executes the device information registering processing, in response to receiving the device ID 26b2 and the like (S212). In the device information registering processing, the mobile terminal device 10 transmits a request for registration of the printer 20 to the server 30. In the request for registration, the device ID 26b2, the device setting and the service ID are included. The service ID 'sv1' is input by the user.

In T58, the server 30 executes device replacement information confirmation, in response to receiving the request for registration. In the device replacement information confirmation, the server 30 confirms whether the device replacement information associated with the device ID 26b2 is an ON state in the device management table KT2. In T60, the server 30 acquires the service ID, in response to the device replacement information being blank and not being an ON state. Note that, in a case where the service ID input by the user is being already used, the server transmits a signal, which indicates that it is necessary to change the service ID, to the mobile terminal device 10. In this case, the mobile terminal device 10 again executes the request for registration by a re-input service ID.

In T62, the server 30 executes device registration, in response to acquiring the service ID. In the device registration, the device ID 26b2 'dv1', the service ID 'sv1', the ink level 'ink1' and the device setting 'dc1' are stored in the device management table KT2 in association with those. In addition, the server 30 sets each of the replacement application information and the device replacement information to an OFF state. Further, the server 30 sets the activation information to an ON state, and ends the device registration. Therefore, the printer 20 can carry out printing.

In T64, the server 30 transmits a device registration completion signal, which indicates that the device registration has been completed, to the mobile terminal device 10, as the device registration has been completed. In T66, the mobile terminal device 10 ends the initial device setting processing, in response to receiving the device registration completion signal, and displays a menu screen 200 on the display 14. The menu screen 200 has a device operation part 210 and a device name display part 220.

The device operation part 210 is a part arranged on an upper side of the menu screen 200 and configured to receive an operation of the printer 20 by the user. In the device operation part 210, icons corresponding to functions of the printer 20, which are included in the device setting, are displayed. In the present embodiment, a first icon 211 corresponding to execution of a copy function, a second icon 212 corresponding to execution of a scan function, a third icon 213 corresponding to execution of a facsimile function, a fourth icon 214 corresponding to change of a setting of each function or confirmation of an ink level, and a fifth icon 215 corresponding to confirmation of the number of printable sheets and execution of charge processing, which will be described later, are displayed in the device operation part 210. The device name display part 220 is arranged on a lower side of the menu screen 200, and a device name (printer name) of a device currently selected is displayed therein.

(Case B)

Subsequently, operations of the printing system 1 that are performed when the above-described initial device setting processing is performed in Case B are described. Case B is a case where the initial device setting processing is performed for a printer 20 already replaced. Case B is a case where after printer replacement, which will be described later, is carried out, the user erroneously selects the replaced printer, for example. In this case, in the device management table KT2, the device replacement information associated with the device ID 26b2 of the replaced printer is an ON state 'O'.

Also in Case B, similar to the above-described Case A, processing similar to T40 to T58 is performed. In T68, the server 30 transmits a device registration stop signal, which indicates that the device registration is stopped, in response to the device replacement information being an ON state. The mobile terminal device 10 ends the initial device setting processing, in response to receiving the device registration stop signal. In this case, the mobile terminal device 10 performs a display (not shown), which indicates that the initial device setting processing is stopped.

(Print Processing)

Figure 8A:
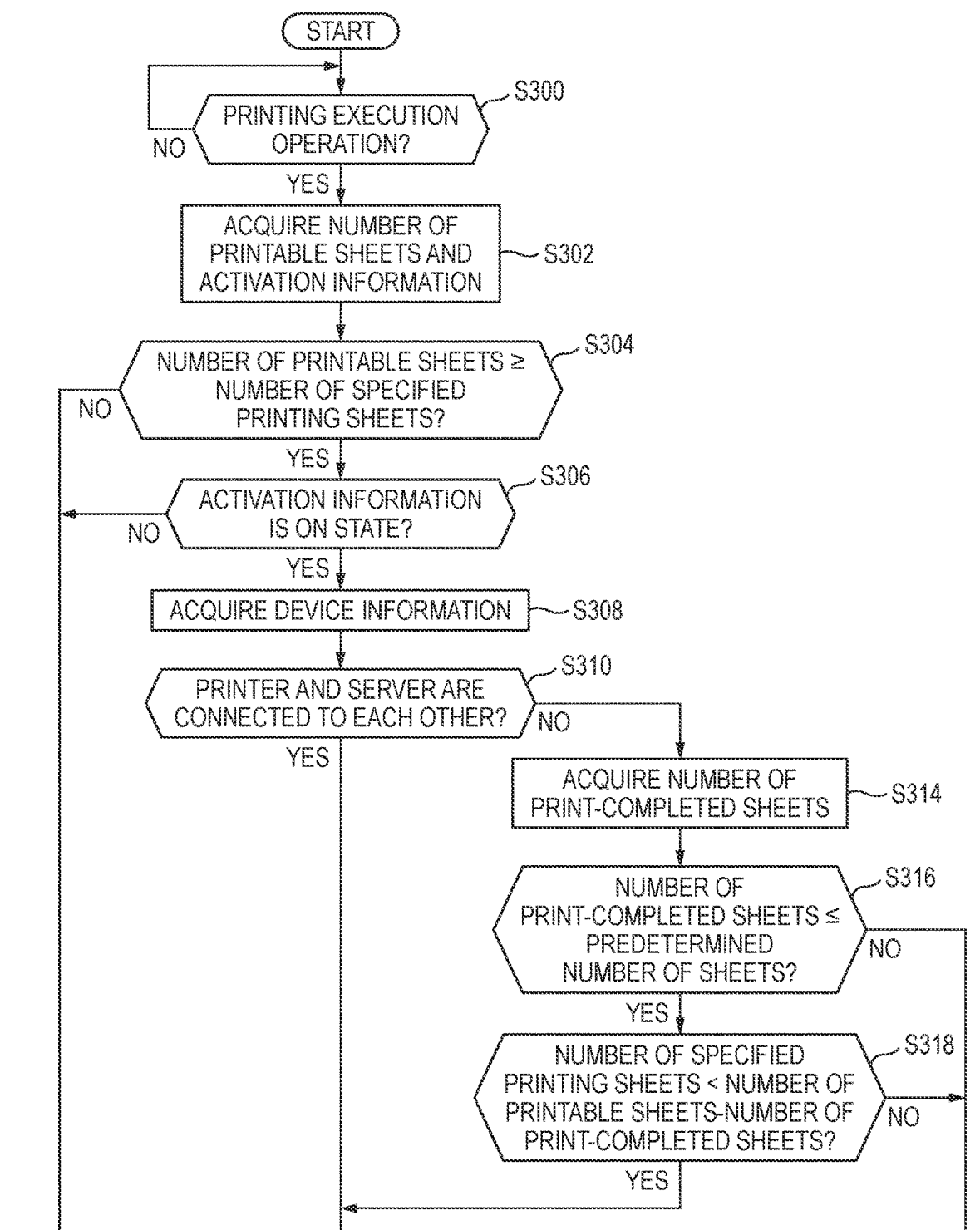
FIGS. 8A and 8B show a flowchart of print processing that is performed by the terminal program shown in FIG. 1.
Figure 8B:
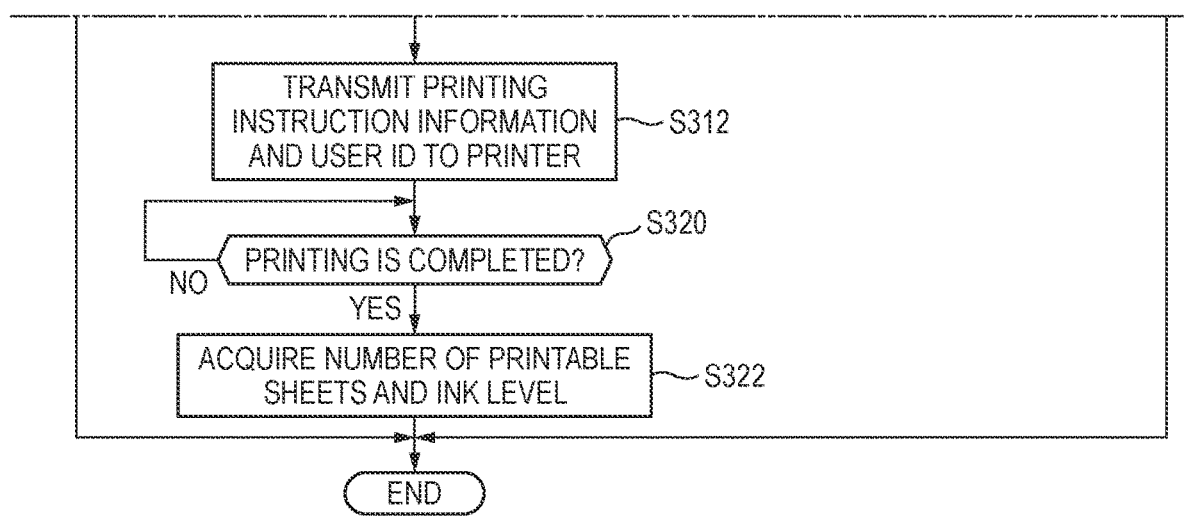

Subsequently, the print processing that is performed by the terminal CPU 11 is described using a flowchart shown in FIGS. 8A and 8B. The print processing is processing of causing the printer 20 to carry out printing.

In S300, the terminal CPU 11 determines whether a printing execution operation has been performed. The printing execution operation is a user operation on the first icon 211 of the menu screen 200. In a printing execution screen (not shown) that is displayed on the display 14, in response to the printing execution operation, a number of sheets and the like that are used for printing are specified. In the below, the number of sheets specified in the printing execution screen is referred to as the number of specified printing sheets.

When the first icon 211 is not operated, the terminal CPU 11 determines NO in S300, and repeatedly executes S300. On the other hand, when the first icon 211 is operated, the terminal CPU 11 determines YES in S300, and acquires the number of printable sheets and the activation information in S302.

Subsequently, in S304, the terminal CPU 11 determines whether the number of printable sheets is equal to or larger than the number of specified printing sheets. When the number of printable sheets is smaller than the number of specified printing sheets, the terminal CPU 11 determines NO in S304, and ends the print processing. In this case, a prompt of charge processing of the number of printable sheets, which will be described later, is displayed on the display 14. On the other hand, when the number of printable sheets is equal to or larger than the number of specified printing sheets, the terminal CPU 11 determines YES in S304, and confirms whether the activation information is an ON state, in S306.

When the activation information is an OFF state, the terminal CPU 11 determines NO in S306, and ends the print processing. In this case, since the activation information is an OFF state, a prompt of the initial device setting processing is displayed on the display 14. On the other hand, when the activation information is an ON state, the terminal CPU 11 determines YES in S306, and acquires device information in S308. The device information is information including whether the printer 20 and the server 30 are connected to each other.

Subsequently, in S310, the terminal CPU 11 confirms whether the printer 20 and the server 30 are connected to each other. When it is indicated in the device information that the printer 20 and the server 30 are connected to each other, the terminal CPU 11 determines YES in S310, and proceeds to S312. On the other hand, when it is indicated in the device information that the printer 20 and the server 30 are not connected to each other, the terminal CPU 11 determines NO in S310, and acquires the number of print-completed sheets 26*b*3 in S314.

Subsequently, in S316, the terminal CPU 11 determines whether the number of print-completed sheets 26*b*3 is equal to or smaller than a predetermined number of sheets. The predetermined number of sheets is a number of sheets by which execution of the printing by the printer 20 is permitted when the printer 20 and the server 30 are not connected to each other. The predetermined number of sheets is, for example, 20 sheets. When the number of print-completed sheets 26*b*3 is larger than the predetermined number of sheets, the terminal CPU 11 determines NO in S316, and ends the print processing. In this case, a prompt of connection between the printer 20 and the server 30 is displayed on the display 14.

On the other hand, when the number of print-completed sheets 26*b*3 is equal to or smaller than the predetermined number of sheets, the terminal CPU 11 determines YES in S316, and determines whether the number of specified printing sheets is smaller than a number of sheets (hereinafter, referred to as 'number of subtracted sheets') obtained by subtracting the number of print-completed sheets 26*b*3 from the number of printable sheets. When the number of specified printing sheets is equal to or larger than the number of subtracted sheets, the terminal CPU 11 determines NO in S318, and ends the print processing. In this case, a prompt of connection between the above printer 20 and the server 30 is displayed on the display 14. On the other hand, when the number of specified printing sheets is smaller than the number of subtracted sheets, the terminal CPU 11 determines YES in S318, and proceeds to S312.

In S312, the terminal CPU 11 transmits printing instruction information and the user ID 12*b* to the printer 20, thereby causing the printer to carry out printing. The printing instruction information is information about the setting of printing specified by the user's printing execution operation. The printing instruction information is the print data 12*c*, the number of specified printing sheets, a color tone, and the like. Subsequently, in S320, the terminal CPU 11 determines whether printing is completed. When a printing completion signal, which will be described later, is received from the printer 20, the terminal CPU 11 determines YES in S320, and acquires the number of printable sheets and the ink level in S322.

(Operations of Printing System 1 in Print Processing)
(Case C)

Figure 9A:
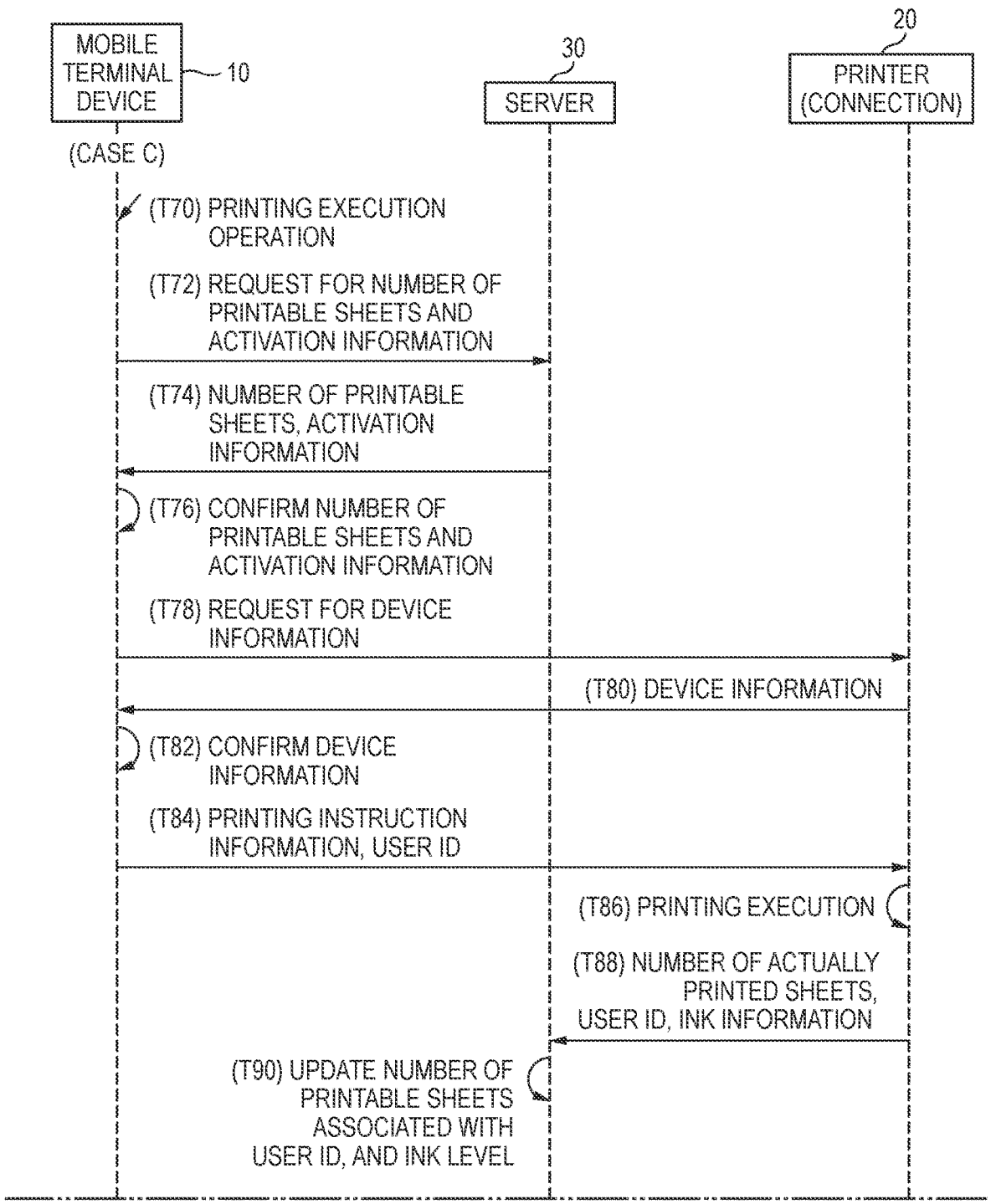
FIGS. 9A and 9B show a sequence diagram when the flowchart of the print processing shown in FIGS. 8A and 8B is performed.
Figure 9B:
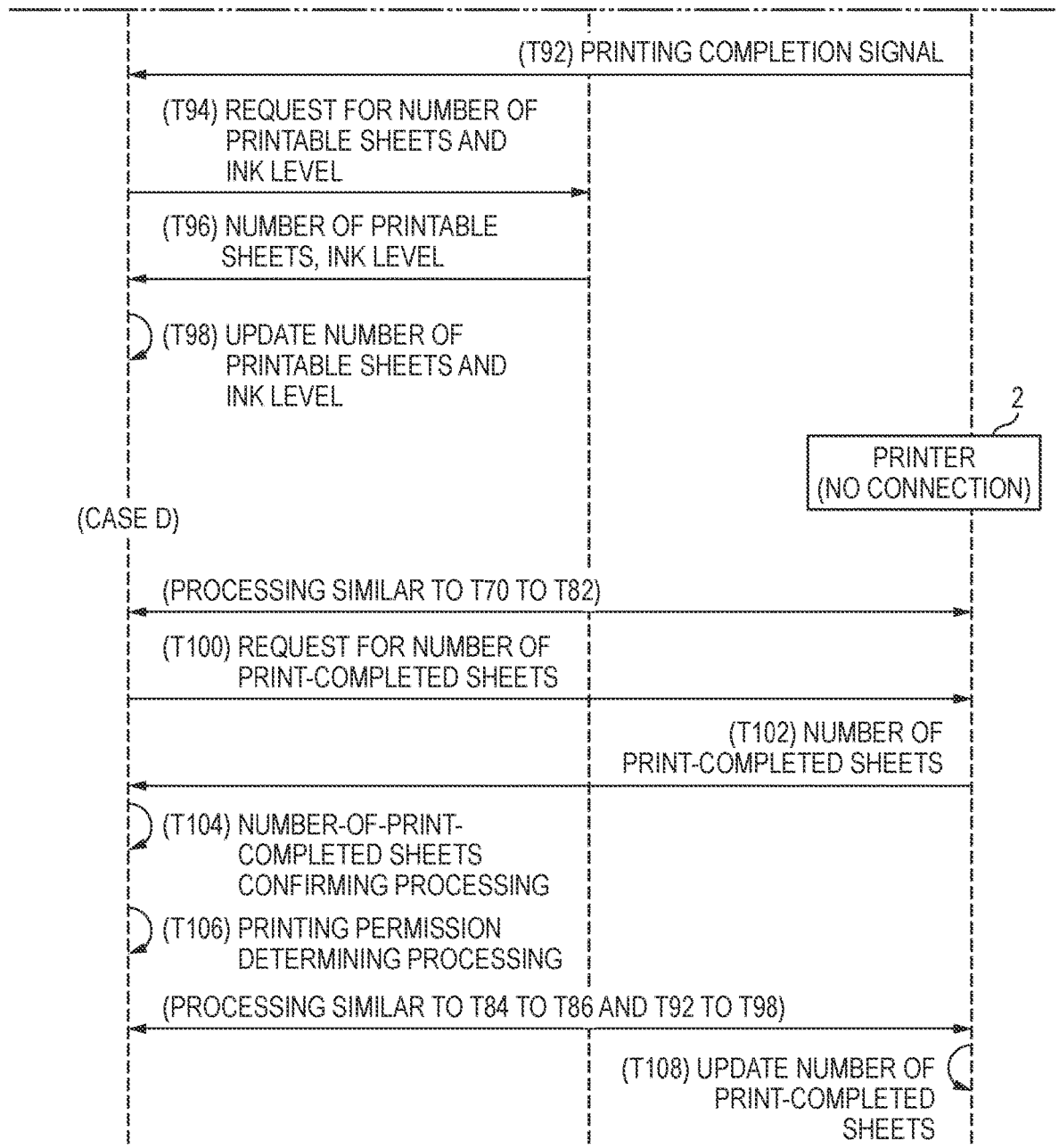

Subsequently, operations of the printing system 1 that are performed when the above-described print processing is performed in Case C are described using FIGS. 9A and 9B. Case C is a state where the activation information is an ON state, the number of printable sheets is sufficient with respect to the number of specified printing sheets and the printer 20 and the server 30 are connected to each other.

In T70, the mobile terminal device 10 receives a user's printing execution operation (YES in S300). In T72, the mobile terminal device 10 transmits a request for number of printable sheets for acquiring the number of printable sheets and a request for activation information for acquiring the activation information to the server 30, in response to receiving the printing execution operation.

In T74, the server 30 transmits signals indicative of the number of printable sheets and the activation information, in response to the requests from the mobile terminal device 10. In T76, the mobile terminal device 10 confirms the number of printable sheets and the activation information (S304, S306), in response to acquiring the number of printable sheets and the activation information from the server 30 (S302). Specifically, it is confirmed that the number of printable sheets is equal to or larger than the number of specified printing sheets specified by the printing execution operation and the activation information is an ON state (YES in S304 and S306).

In T78, the mobile terminal device 10 transmits a request for device information for acquiring the device information to the printer 20. In T80, the printer 20 transmits the device information to the mobile terminal device 10, in response to receiving the request for device information. In T82, the mobile terminal device 10 confirms connection between the printer 20 and the server 30, in response to receiving the device information (S310). In T84, the mobile terminal device 10 transmits the printing instruction information and the user ID 12*b* to the printer 20 (S312), in response to confirming connection between the printer 20 and the server 30 (YES in S310).

In T86, the printer 20 executes printing, based on the printing instruction information. In T88, the printer 20 transmits a number of actually printed sheets, the user ID 12*b* and the ink level to the server 30, in response to carrying out the printing. The number of actually printed sheets is the number of sheets actually used by the printer 20.

In T90, the server 30 updates the number of printable sheets associated with the user ID 12*b* in the user management table KT1 so that the number of actually printed sheets is subtracted, and updates the ink level in the device management table KT2, in response to receiving the number of actually printed sheets, the user ID 12*b* and the ink level from the printer 20. In T92, the printer 20 transmits a printing completion signal indicating that the printing has been completed.

In T94, the mobile terminal device 10 transmits a request for number of printable sheets for acquiring the number of printable sheets and a request for ink level for acquiring the ink level to the server 30, in response to receiving the printing completion signal (YES in S320). In T96, the server 30 transmits signals indicative of the number of printable sheets and the ink level to the mobile terminal device 10, in response to receiving each request. In T98, the mobile terminal device 10 updates the number of printable sheets and the ink level, in response to receiving the number of printable sheets and the ink level (S322).

(Case D)

Subsequently, operations of the printing system 1 that are performed when the above-described print processing is performed in Case D are described. Case D is a state where the printer 20 and the server 30 are not connected to each other, with respect to Case C. In addition, in Case D, the number of print-completed sheets 26b3 is equal to or smaller than the predetermined number of sheets.

Also in Case D, similar to the above-described Case C, processing similar to T70 to T82 is performed. In T100, the mobile terminal device 10 transmits a request for number of print-completed sheets for acquiring the number of print-completed sheets 26b3 to the printer 20, in response to confirming that the printer 20 and the server 30 are not connected to each other (NO in S310). In T102, the printer 20 transmits a signal indicative of the number of print-completed sheets 26b3 to the mobile terminal device 10, in response to receiving the request for number of print-completed sheets.

In T104, the mobile terminal device 10 executes number-of-print-completed sheets confirming processing of confirming whether the number of print-completed sheets 26b3 is equal to or smaller than the predetermined number of sheets (S316), in response to acquiring the number of print-completed sheets 26b3 (S314). In T106, the mobile terminal device 10 executes printing permission determining processing of determining whether the number of specified printing sheets is smaller than the number of subtracted sheets (S318), in response to the number of print-completed sheets 26b3 being equal to or smaller than the predetermined number of sheets (YES in S316).

The mobile terminal device 10 executes processing similar to T84 to T86 and T92 to T98, in response to the number of specified printing sheets being smaller than the number of subtracted sheets (YES in S318). T88 and T90 are not performed because the printer 20 and the server 30 are not connected to each other. In addition, since the number of printable sheets and the ink level are not updated in T90, also in T98, the number of printable sheets and the ink level are not substantially updated.

In T108, the printer 20 updates the number of print-completed sheets 26b3, in response to transmitting the printing completion signal in T92, in a state where the printer 20 and the server 30 are not connected to each other. Specifically, the number of sheets actually used (the number of actually printed sheets) for the printing carried out in T86 is added up. In this way, the number of print-completed sheets 26b3 is increased by the number of actually printed sheets, in response to the printing being carried out in the state where the printer 20 and the server 30 are not connected to each other.

Note that, in a case where the printer 20 and the server 30 are connected to each other from the state of Case D, the number of print-completed sheets 26b3 is transmitted to the server 30 by the printer 20, so that the server 30 subtracts the number of print-completed sheets 26b3 from the number of printable sheets. In addition, the printer 20 resets the number of print-completed sheets 26b3 to zero. Therefore, the number of actually printed sheets in the printing carried out in the state where the printer 20 and the server 30 are not connected to each other is reflected on the number of printable sheets in the server 30.

(Case E: Not Shown)

Subsequently, operations of the printing system 1 that are performed when the above-described print processing is performed in Case E are described. In Case E, the number of print-completed sheets 26b3 is larger than the predetermined number of sheets, with respect to Case D.

Also in Case E, similar to the above-described Case C, processing similar to T70 to T82 and T100 to T104 is performed. In T110, the print processing is ended, in response to the number of print-completed sheets 26b3 being larger than the predetermined number of sheets (NO in S316).

(Charge Processing)

Figure 10:
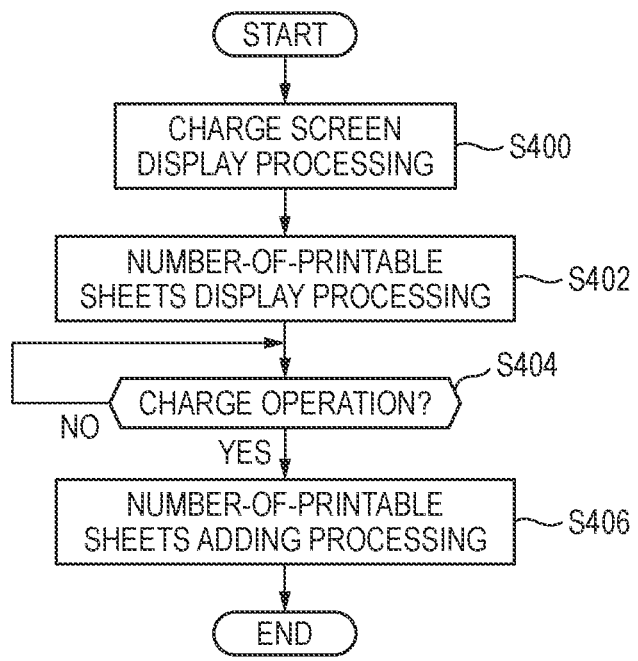
FIG. 10 is a flowchart of charge processing that is performed by the terminal program shown in FIG. 1.
Figure 11:
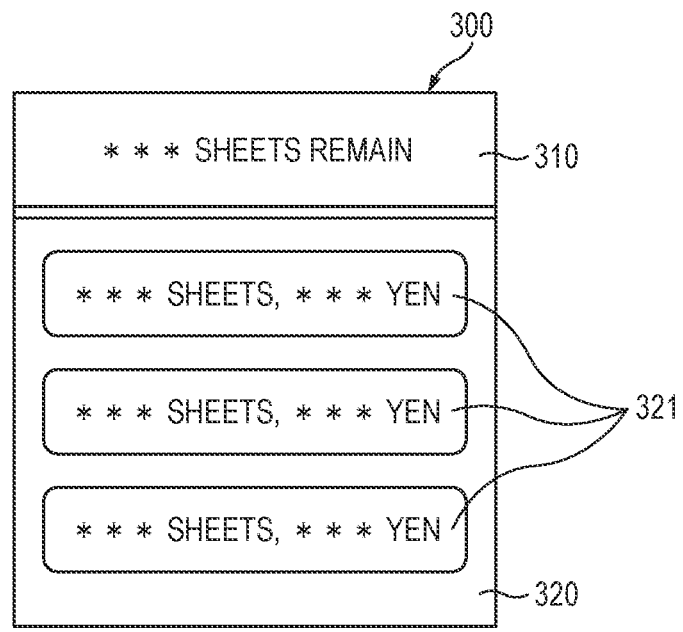
FIG. 11 shows a charge screen that is displayed on a display shown in FIG. 1.

Subsequently charge processing that is performed by the terminal CPU 11 is described using a flowchart shown in FIG. 10. The charge processing is processing of adding the number of printable sheets, in response to charging for the number of printable sheets being paid by the user. The charge processing can be performed on a charge screen 300 shown in FIG. 11. The charge screen 300 has a number-of-printable sheets display part 310 and a number-of-charge sheets display part 320.

The number-of-printable sheets display part 310 is arranged on an upper side of the charge screen 300, and is configured to display the number of printable sheets associated with the user ID 12b stored in the user management table KT1. The number-of-charge sheets display part 320 is arranged on a lower side of the charge screen 300, and a plurality of charge icons 321 is displayed in a list form. In the plurality of respective charge icons 321, the numbers of sheets different from each other and amounts of charging corresponding to the numbers of sheets are displayed.

Returning to FIG. 10, the charge processing is described. The charge processing is started, in response to a user's operation of the fifth icon 215 on the menu screen 200.

In S400, the terminal CPU 11 executes charge screen display processing. The charge screen display processing is processing where the fifth icon 215 is operated on the menu screen 200, so that the terminal CPU 11 displays the charge screen 300 on the display 14.

Subsequently, in S402, the terminal CPU 11 executes number-of-printable sheets display processing, in response to the charge screen 300 being displayed. The number-of-printable sheets display processing is processing of acquiring the number of printable sheets stored in the server 30 and causing the number-of-printable sheets display part 310 to display the number of printable sheets. Specifically, the terminal CPU 11 transmits a request for number of printable sheets for acquiring the number of printable sheets to the server 30. The server 30 receiving the request for number of printable sheets transmits a signal indicative of the number of printable sheets to the mobile terminal device 10. Therefore, the mobile terminal device 10 acquires the number of printable sheets and displays the number of printable sheets on the number-of-printable sheets display part 310.

Subsequently, in S404, the terminal CPU 11 determines whether a charge operation has been performed. The charge operation is a user operation on the charge icons 321. In response to the user's operation on the charge icon 321 on which the number of printable sheets desired by the user is displayed, the terminal CPU 11 determines YES in S404, and executes number-of-printable sheets adding processing in S406.

The number-of-printable sheets adding processing is processing of adding the number of sheets (hereinafter, referred to as 'number of charge sheets') displayed on the charge icon 321 operated by the user to the number of printable sheets stored in the user management table KT1. Specifically, the mobile terminal device 10 transmits the number of charge sheets to the server 30. The server 30 updates the number of printable sheets so as to add the number of charge sheets transmitted from the mobile terminal device 10 to the number of printable sheets. The mobile terminal device 10 acquires the number of printable sheets updated by the server 30, so that the number of printable sheets to which the number of charge sheets has been added is displayed on the number-of-printable sheets display part 310. In the present printing system 1, the user can charge (add) the desired number of sheets to the number of printable sheets, irrespective of the ink level of the printer 20 selected in the initial device setting processing. Note that, the amount of charging displayed on the charge icon 321 operated by the user is billed from the vendor to the user.

(Device replacement Request Notifying Processing)

Figure 12:
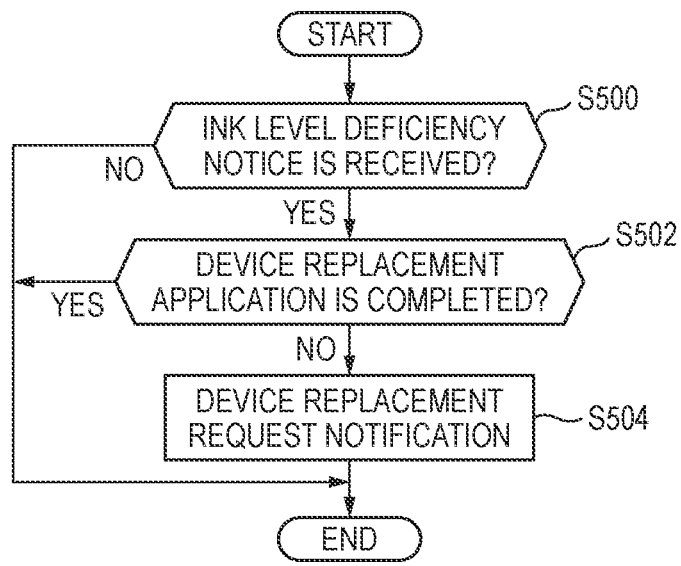
FIG. 12 is a flowchart of device replacement request notifying processing that is performed by the terminal program shown in FIG. 1.

Subsequently, device replacement request notifying processing that is performed by the terminal CPU 11 is described using a flowchart shown in FIG. 12. The device replacement request notifying processing is processing of issuing a device replacement request notification, which is a notification of prompting the user to replace the printer 20.

In S500, the terminal CPU 11 determines whether an ink level deficiency notice is received.

The ink level deficiency notice is a notice that is transmitted from the server 30, in response to the ink level stored in the device management table KT2 being equal to or less than a predetermined level. The predetermined level corresponds to, for example, 20% of an amount of ink filled at the time when the printer 20 is supplied from the vendor. The ink level deficiency notice is noticed, in response to the ink level of at least one tank unit 23 of the ink levels of the plurality of tank units 23 being equal to or less than the predetermined level.

The terminal CPU 11 determines YES in S500, in response to receiving the ink level deficiency notice, and confirms whether a device replacement application is completed, in S502. Specifically, it is confirmed whether the replacement application information stored in the device management table KT2 is an ON state. The terminal CPU 11 determines YES in S502, in response to the device replacement application being completed by the ON state of the replacement application information, and ends the device replacement request notifying processing. On the other hand, when the device replacement is not completed by the OFF state of the replacement application information, the terminal CPU11 determines NO in S502, and executes the device replacement request notifying processing. By the device replacement request notifying processing, a prompt (not shown) of replacement of the device (printer) is displayed on the display 14.

(Device Replacement Applying Processing)

Figure 13:
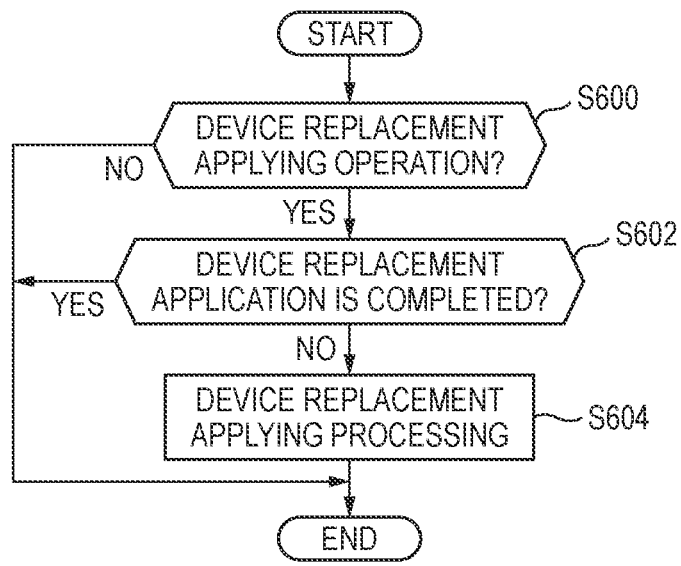
FIG. 13 is a flowchart of device replacement applying processing that is performed by the terminal program shown in FIG. 1.

Subsequently, device replacement applying processing that is performed by the terminal CPU 11 is described using a flowchart shown in FIG. 13. The device replacement applying processing is processing where the vendor applies for replacement of the printer 20 to a vendor server 4, which is a server for managing the present system.

In S600, the terminal CPU 11 determines whether a device replacement applying operation has been performed. The device replacement applying operation is a user operation on a device replacement applying icon 120. The device replacement applying icon 120 is arranged on a lower side of the device selecting screen 100 (FIGS. 7A and 7B). The terminal CPU 11 determines YES in S600, in response to the device replacement applying operation being performed, and confirms whether a device replacement application is completed, in S602, similar to the above-described S502.

The terminal CPU 11 determines YES in S602, in response to the device replacement application being completed, and ends the device replacement applying processing. On the other hand, when the device replacement is not completed, the terminal CPU 11 determines NO in S602, and executes the device replacement applying processing in S604. By the device replacement applying processing, an application screen (not shown) by which application information such as a delivery destination of a new printer can be input is displayed on the display 14.

The application information input to the application screen by the user is transmitted to the vendor server 4, together with the currently set device ID 26b2 of the printer 20. The vendor server 4 performs a predetermined setting, which will be described later, on the new printer and delivers the new printer to the user.

(Operations of Printing System 1 in Device Replacement Request Notifying Processing and Device Replacement Applying Processing)

Figure 14:
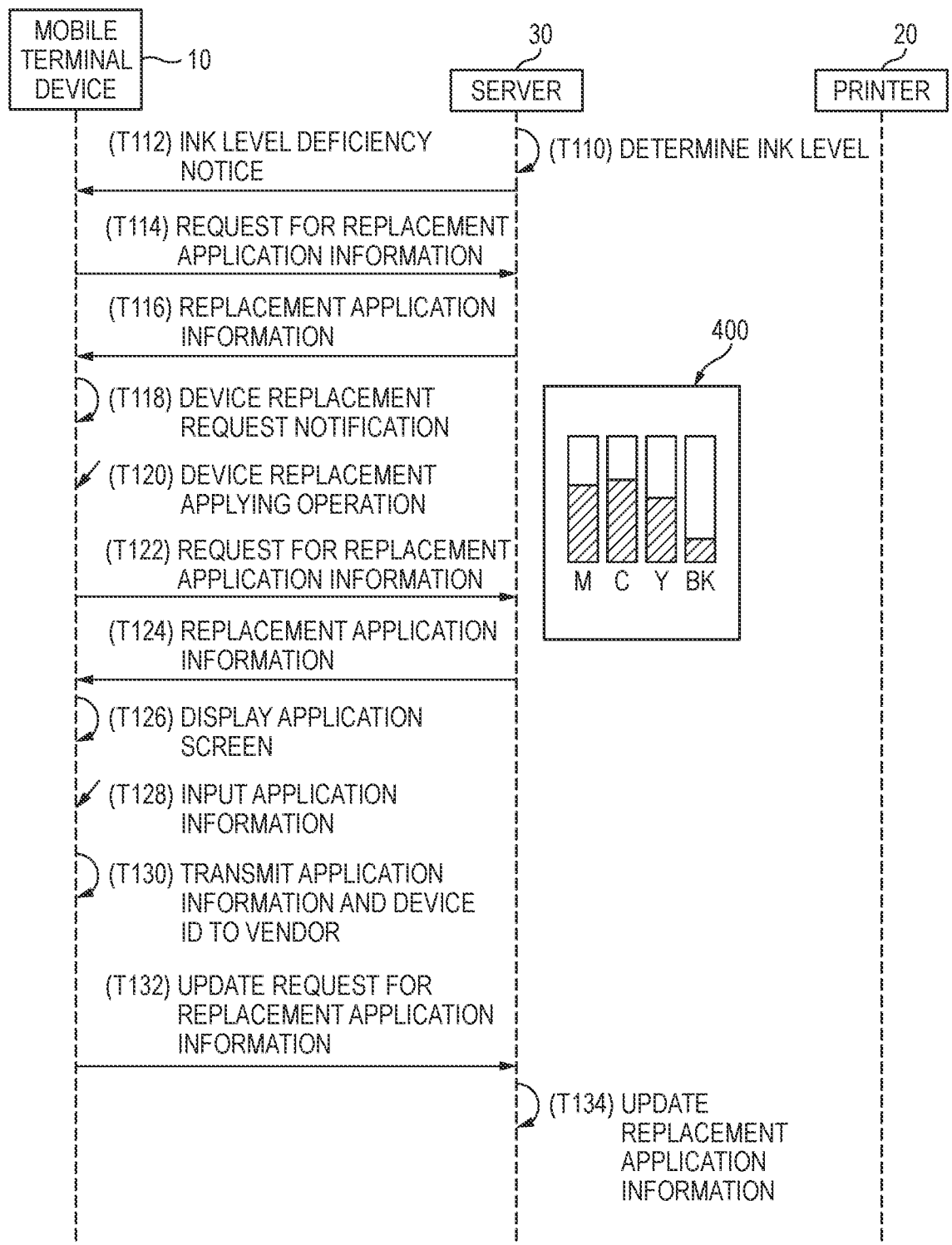
FIG. 14 is a sequence diagram when the flowcharts of the device replacement request notifying processing shown in FIG. 12 and the device replacement applying processing shown in FIG. 13 are performed.

Subsequently, as for operations of the printing system 1 that are performed when the device replacement request notifying processing and the device replacement applying processing are performed, a case where the ink level is equal to or less than a predetermined level and the replacement application information is an OFF state is described using FIG. 14.

In T110, the server 30 executes ink level determination of determining whether the ink level stored in the device management table KT2 becomes equal to or less than a predetermined level. As for the ink level of the printer 20, the black BK is equal to or less than the predetermined level, as shown on an ink level display screen 400 that is displayed based on an operation on the fourth icon 214.

In T112, the server 30 transmits an ink level deficiency notice to the mobile terminal device 10, in response to the ink level being determined as being equal to or less than the predetermined level by the ink level determination. In T114, the mobile terminal device 10 transmits a request for replacement application information for acquiring replacement application information of the printer 20 to the server 30, in response to receiving the ink level deficiency notice (YES in S500).

In T116, the server 30 transmits a signal indicative of the replacement application information to the mobile terminal device 10, in response to receiving the request for replacement application information. In T118, the mobile terminal device 10 displays a device replacement request notification on the display 14 (S504), in response to the replacement application information being an OFF state (YES in S502).

In T120, the mobile terminal device 10 receives a device replacement applying operation (YES in S600). In T122 and T124, the mobile terminal device 10 performs processing similar to the above-described T114 and T116 (S602). In T126, the mobile terminal device 10 displays the application screen, in response to receiving the replacement application information (S604). In T128, the user inputs predetermined information as the application information on the application screen.

In T130, the mobile terminal device 10 transmits signals indicative of the application information and the device ID 26b2 to the vendor server 4. In T132, the mobile terminal device 10 transmits a request for replacement application information update for updating the replacement application information to the server 30. In T134, the server 30 updates the replacement application information stored in the device management table KT2 from an OFF state to an ON state, in response to receiving the request for replacement application information update.

(Device Replacing Processing)

Subsequently, as for device replacing processing that is performed by the terminal CPU 11, a case of replacement from an old device to a new device shown in FIG. 17 is described using a flowchart shown in FIG. 15. The old device is the printer 20 that has been used so far, and is the printer 20 that has applied for the above-described replacement.

As for the old device, specifically, the device ID 26b2 is 'dv2', and the service ID is 'sv2' set in the initial device setting processing. In addition, the ink level 'ink2' is equal to or less than the predetermined level. The replacement application information is 'O' as a result of the above-described replacement application. Furthermore, the activation information is set to the ON state 'O' by the initial device setting processing. Furthermore, the device replacement information is the OFF state because the device has not been replaced yet. The device setting is set to 'dc2'.

On the other hand, the new device is a printer delivered from the vendor to the user as a result of the device replacement applying processing in the old device. For the new device, a predetermined setting has been made by the vendor server 4. Specifically, as for the new device, the device ID 26b2 is 'dv3'. For the service ID, 'sv2' that is the same as the service ID of the old device is set. Regarding this, in the device replacement applying processing, the device ID 26b2 of the old device is transmitted to the vendor server 4, so that a service ID associated with the device ID 26b2 of the old device is discovered by the vendor server 4 and the service ID is set for the service ID of the new device.

In the new device, the ink level 'ink3' corresponds to an ink level capable of printing the above-described predetermined number of printable sheets. The replacement application information, the activation information and the device replacement information are set to the OFF states 'X'. The device setting is set to 'dc3'.

Returning to FIG. 15, the device replacing processing is described from a state where the old device and the new device are discovered by device discovery and both the devices are displayed on the device selecting screen 100 (FIGS. 7A and 7B).

In S700, the terminal CPU 11 determines whether a device replacing operation has been performed. The device replacing operation is a user operation on a device replacing icon (not shown). The device replacing icon is arranged, for example, on a lower side of the device selecting screen 100. The terminal CPU 11 determines YES in S700, in response to the device replacing operation being performed, and determines whether a new device selecting operation has been performed, in S702. The new device selecting operation is a user operation of selecting a new device, and is an operation on the display field 110, in which a new device is displayed, of the device selecting operation 100.

The terminal CPU 11 determines YES in S702, in response to the new device selecting operation being performed, and acquires the device replacement information and activation information of the new device, in S704. Subsequently, in S706, the terminal CPU 11 determines whether the device replacement information is an OFF state. In a case where the user erroneously selects a printer already replaced as a new device, the printer replacement information of the new device is an ON state. In this case, the terminal CPU 11 determines NO in S706, in response to the printer replacement information being an ON state, and ends the device replacing processing.

On the other hand, in a case where the device replacement information associated with the printer selected as a new device is an OFF state, the terminal CPU 11 determines YES in S706, in response to the printer replacement information being an OFF state, and confirms whether the activation information of the new device is an OFF state, in S708. In a case where the user erroneously selects a printer, which is currently used and is not scheduled to be replaced, as a new device, the printer replacement information of the new device is an ON state. In this case, the terminal CPU 11 determines NO in S708, in response to the activation information being an ON state, and ends the device replacing processing.

On the other hand, in a case where the activation information associated with the printer selected as a new device is an OFF state, the terminal CPU 11 determines YES in S708, in response to the activation information being an OFF state, and executes new device replacing processing, in S710. The new device replacing processing is processing of setting the activation information of the printer selected as a new device to an ON state.

(Operations of Printing System 1 in Device Replacing Processing)

Figure 16:
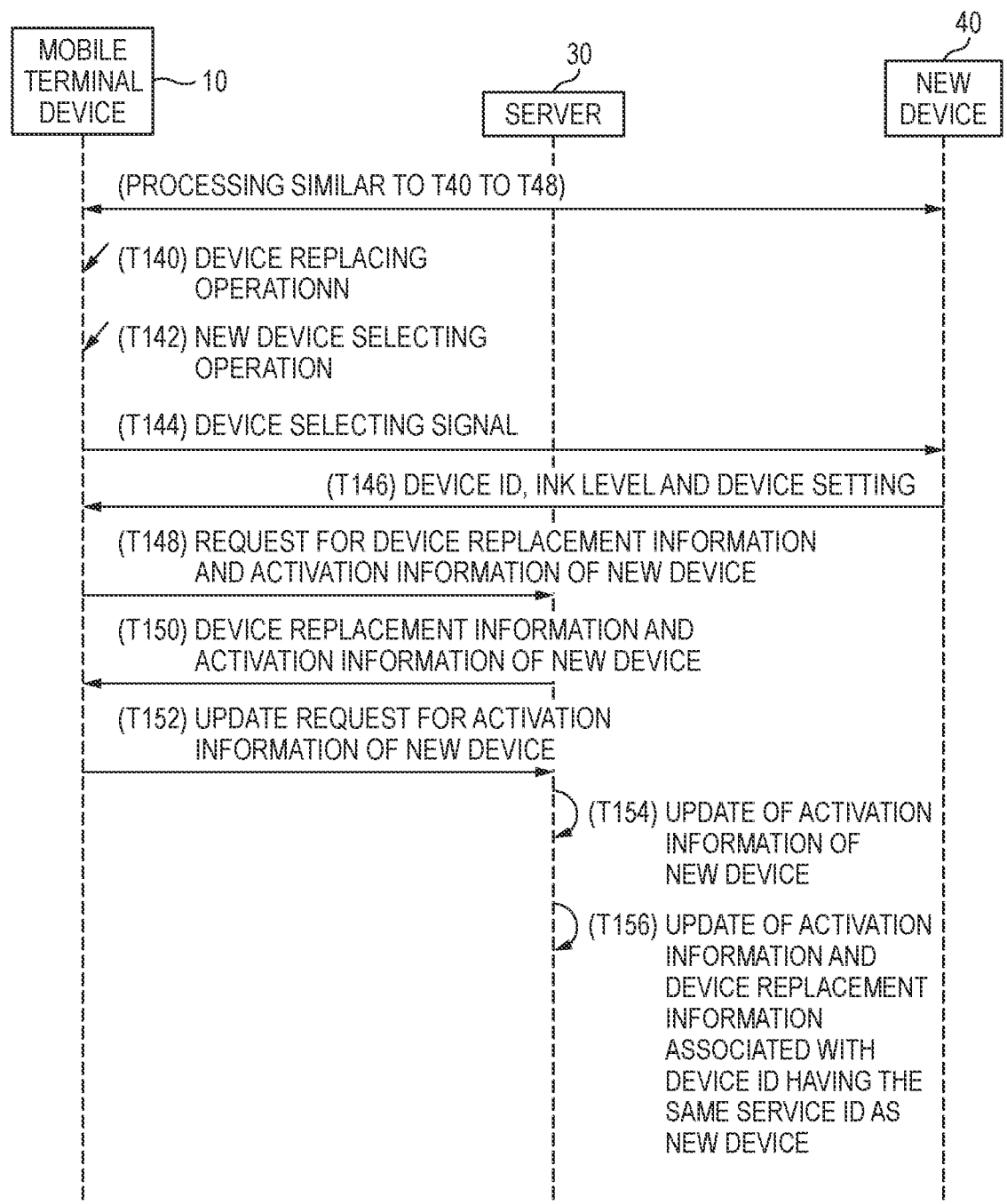
FIG. 16 is a sequence diagram when the flowchart of the device replacing processing shown in FIG. 15 is performed.

Subsequently, as for operations of the printing system 1 that are performed when the above-described device replacing processing is performed, a case of replacement from an old device to a new device 40 shown in FIG. 17 is described using a sequence diagram shown in FIG. 16.

First, processing similar to the above-described T40 to T48 is performed, and the device selecting screen 100 is displayed on the display 14 (FIGS. 7A and 7B). In the display fields 110 of the device selecting screen 100, the old device and the new device 40 are displayed. In T140, the mobile terminal device 10 receives a device selecting operation, in response to a user's operation on the device replacing icon (YES in S700). In T142, the mobile terminal device 10 receives a new device selecting operation, in response to a user's operation on the display field 110 of the new device 40 in the device selecting screen 100 (YES in S702).

In T144, the mobile terminal device 10 transmits a device selecting signal similar to the above-described T52 to the new device 40, in response to receiving the new device selecting operation. In T146, the new device 40 transmits the device ID 26b2, the ink level and the device setting to the mobile terminal device 10, in response to receiving the device selecting signal, similar to the above-described T54.

In T148, the mobile terminal device 10 transmits a request for device replacement information and a request for activation information of the new device 40 to the server 30, in response to acquiring the device ID 26b2 and the like of the new device 40. In T150, the server 30 transmits the device replacement information and activation information associated with the device ID 26b2 'dv3' of the new device 40 to the mobile terminal device 10, in response to receiving the request for device replacement information and activation information of the new device 40.

In T152, the mobile terminal device 10 transmits an update request of the activation information of the new device 40 to the server 30 (S710), in response to the device replacement information and activation information of the new device 40 being OFF states (YES in S706 and S708).

In T154, the server 30 updates the activation information associated with the device ID 26b2 'dv3' of the new device 40 from the OFF state to the ON state, in response to receiving the update request of the activation information of the new device 40. This allows the user to perform printing with using the new device 40.

In T156, the server 30 updates the activation information and the device replacement information associated with the device ID 26b2 having the same service ID as the service ID of the new device 40, in response to the update of the activation information of the new device 40. The device ID 26b2 having the same service ID as 'sv2' as the service ID of the new device 40 is the device ID 26b2 'dv2' of the old device. Therefore, the activation information associated with the device ID 26b2 'dv2' of the old device is updated from the ON state to the OFF state, and the device replacement information associated with the device ID 26b2 'dv2' of the old device is updated from the OFF state to the ON state. Therefore, the use of the old device is restricted, so that the user cannot perform printing. By the above-described device replacing processing, each item in the device management tables KT2 of the old device and the new device is updated from the state shown in FIG. 17 to the state shown in FIG. 2.

(Effects)

According to the terminal program 12a of the above-described printing system 1, it is possible to continuously use the printing service as appropriate, according to the number of sheets that are used for printing.

In addition, the number of printable sheets is charged, so that the user can perform printing and the printer 20 whose ink level is reduced is replaced. Therefore, the printing system 1 can appropriately charge the user.

Furthermore, since the number of printable sheets and the user ID 12b are associated, the user can appropriately manage the number of printable sheets.

Furthermore, the user can conveniently add the number of printable sheets by operating the charge icons 321 displayed on the charge screen 300.

Furthermore, when the print processing is performed, since the user ID is transmitted from the mobile terminal device 10, the user who has performed printing can be conveniently specified.

Furthermore, since the user instructs printing while specifying the number of sheets with the mobile terminal device 10, the user can perform printing as appropriate by the mobile terminal device 10.

Furthermore, since the user is restricted from setting the number of specified printing sheets to the number of printable sheets or larger when performing printing, the printing is performed with the appropriate number of sheets.

Furthermore, even in a state where the printer 20 and the server 30 are not connected to each other, the user can perform printing as appropriate by the printing permission determining processing.

Furthermore, since the device replacement applying icons for requesting replacement of the printer are operatively displayed, the user can request replacement of the printer as appropriate at a desired timing.

Furthermore, since the activation information can set only one printer 20 to an ON state with respect to one service ID, the vendor server 4 can manage an amount of supply of the printer 20 as appropriate.

Furthermore, since the new device replacing processing (S710) is not performed for the printer 20 where the printer replacement information is an ON state, a diversion of the replaced printer 20 is suppressed.

Furthermore, since the replacement of the printer 20 is prompted, in response to the ink level being the predetermined level or less, the printer 20 is replaced as appropriate.

Furthermore, the printer 20 is replaced as a whole, in response to the ink level being the predetermined level or less. Therefore, it is not necessary for the user to perform a troublesome operation of replenishing the ink.

Furthermore, the printer 20 is filled with the ink (2,000 sheets+α) enough to print more sheets than the number of printable sheets (2,000 sheets) given to the user who has applied for the printing service. Therefore, the user can use the printing service without replenishing the printer 20 with ink or replacing the printer 20, at least until the number of printable sheets given at the time of applying for the printing service is completely printed.

Furthermore, in the present printing system 1, the variety of processing such as the initial setting processing, the initial device setting processing, the print processing, the charge processing, the device replacement request notifying processing, the device replacement applying processing and the device replacing processing can be performed via the terminal program 12a. This allows the user to conveniently use the present printing system 1.

(Correspondence)

The mobile terminal device 1 is an example of the 'information processing device'. The terminal CPU 11 is an example of the 'computer'. The terminal program 12a is an example of the 'program'. The ink is an example of the 'colorant'. The number of printable sheets is an example of the 'print-permitted amount'. The number of charge sheets is an example of the 'selected printing amount'. The charge screen 300 is an example of the 'selection screen'. The charge icon 321 is an example of the 'first operation icon'. The number of specified printing sheets is an example of the 'specified printing amount'. S400 is an example of the 'first display processing'. The service ID is an example of the 'service identification information'. The old device is an example of the 'to-be-replaced printer'. The new device 40 is an example of the 'replacing printer'. The number-of-printable sheets adding processing (S406) is an example of the 'addition processing'. The user ID 12b is an example of the 'user identification information'. The number of print-completed sheets is an example of the 'print-completed amount'. The update (T108) of the number of print-completed sheets 26b3 is an example of the 'controller'. The device replacement request notification (S504) is an example of the 'notification processing'. The device replacement applying icon 120 is an example of the 'second operation icon'. S208 is an example of the 'second display processing'. The device replacement applying processing is an example of the 'replacement applying processing'. The display 14 is an example of the 'display unit'.

Modified Embodiments

Although the specific example of the present disclosure has been described in detail, the specific example is just exemplary and does not limit the claims. The technology defined in the claims include various modifications and changes to the specific example described above. The modified embodiments of the above-mentioned embodiment are enumerated below.

In the above-described embodiment, the mobile terminal device 10 is a smart phone. However, instead of this, the mobile terminal device 10 may also be a terminal such as a desktop computer, a laptop computer and a tablet PC that is used by the user.

In addition, in the above-mentioned embodiment, the printer 20 is an inkjet printer. However, instead of this, the printer 20 may also be a laser printer or a thermal printer.

In the above-described embodiment, the ink level detection unit 24 is configured to detect the ink level with using the optical sensor. However, instead of this, the ink level may also be detected based on the number of operation times of an ink head configured to eject ink at the time of printing. In addition, the ink level may also be detected based on a consumed amount of ink used for printing. The consumed amount of ink is derived, for example, based on the number of dots calculated from the print data 12c.

In the above-described embodiment, the replacement of the printer is carried out based on the ink level. However, instead of this, the replacement of the printer may also be carried out when a failure occurs in the printer 20 or when the user desires a printer different from the printer 20 that is currently used.

In the above-described embodiment, the user gets the printer 20 as the printer is delivered from the vendor. However, instead of this, the user may also get the printer 20 from an actual store such as a retail store or a virtual store such as an EC site established on the Internet 3.

Figure 5:
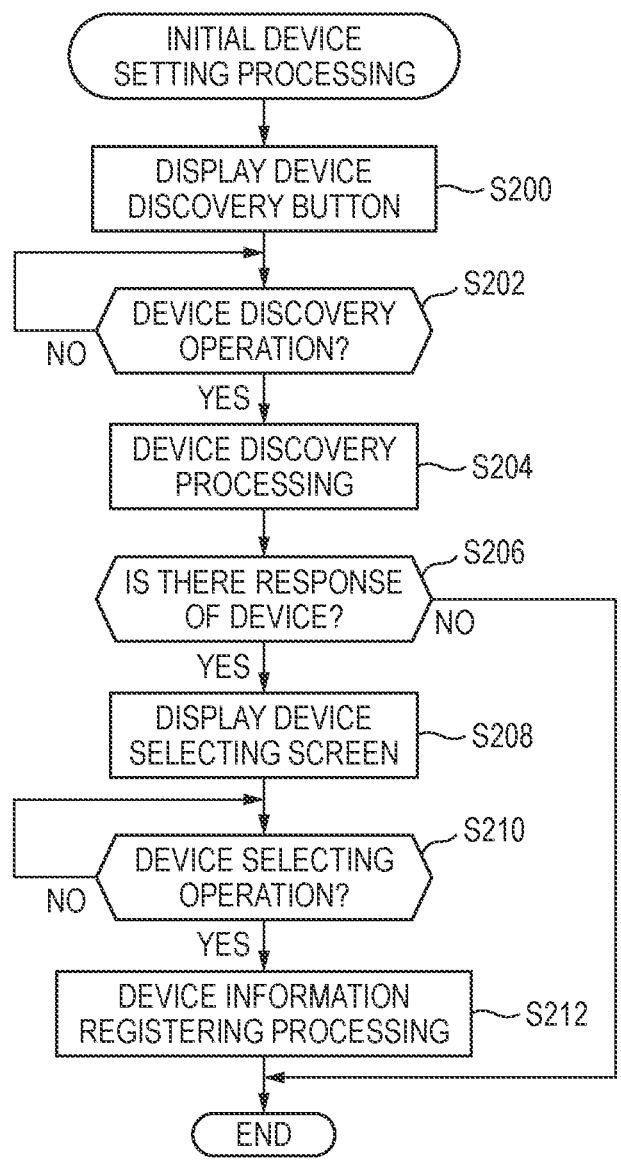
FIG. 5 is a flowchart of initial device setting processing shown in FIG. 3.
Figure 15:
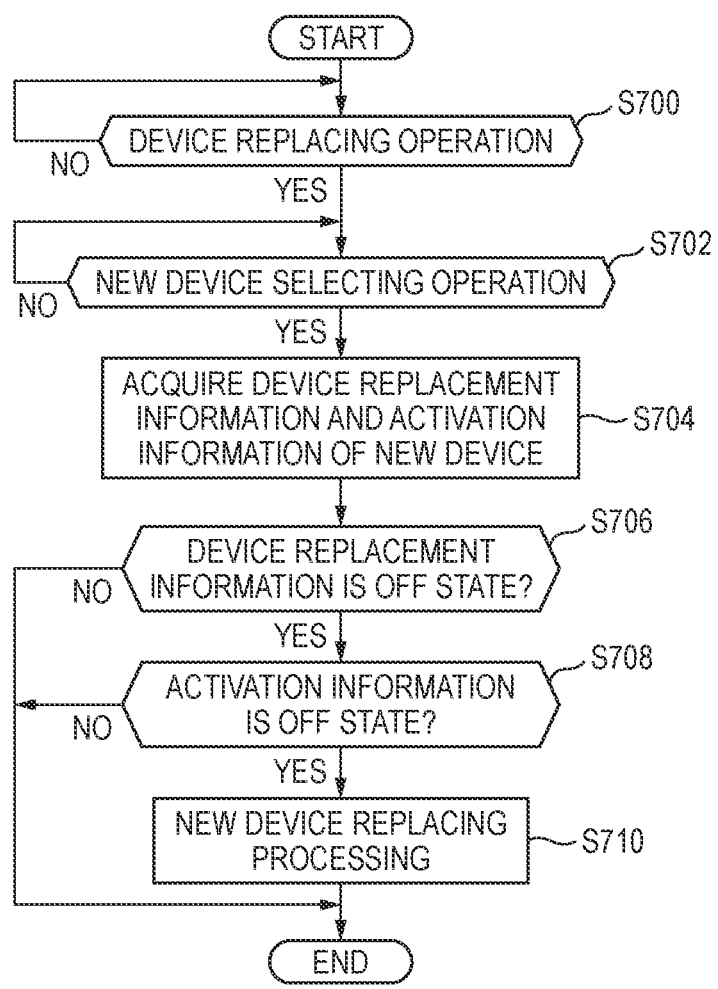
FIG. 15 is a flowchart of device replacing processing that is performed by the terminal program shown in FIG. 1.

In the above-described embodiment, the device selecting operation in S210 of FIG. 5 and in S702 of FIG. 15 is an operation by which any printer is selected on the device selecting operation 100. However, instead of this, the device selecting operation may also be an action where the user brings the mobile terminal device 10 close to the printer 20, which is a selection target. Specifically, the mobile terminal device 10 receives the device selecting operation, in response to the printer 20 and the mobile terminal device 10 being connected at a short distance by wireless communication by bringing the near field communication unit 13 of the mobile terminal device 10 close to the near field communication unit 21 of the printer 20.

Figure 3:
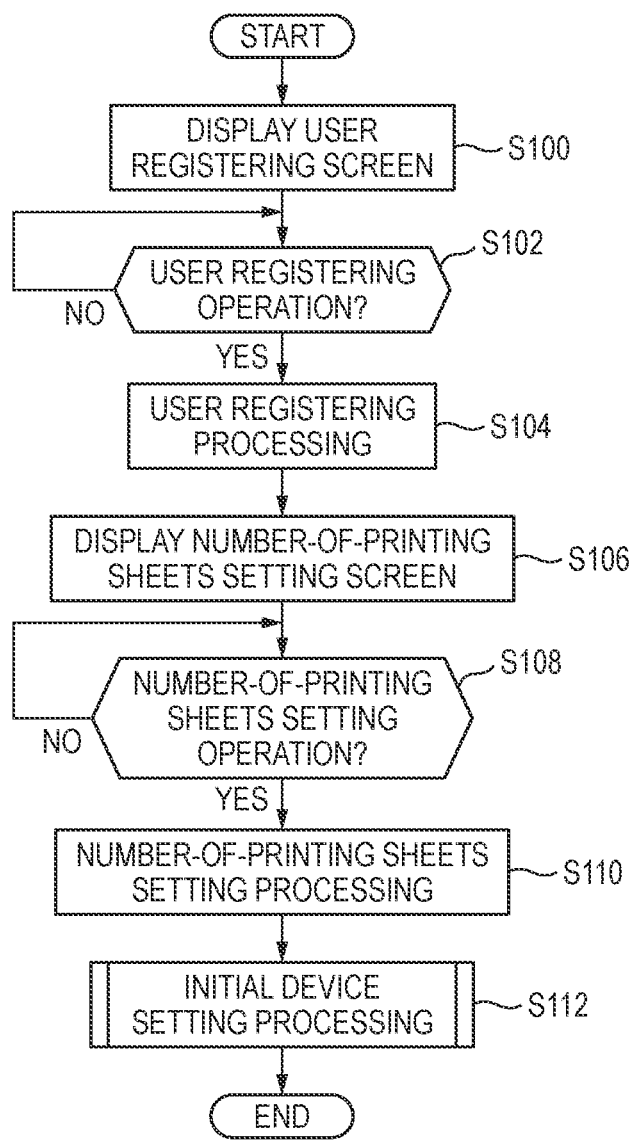
FIG. 3 is a flowchart of initial setting processing that is performed by a terminal program shown in FIG. 1.

In the above-described embodiment, in the number-of-printing sheets setting processing in S110 of FIG. 3, the predetermined number of printable sheets given at the time when the printer 20 is delivered is stored in the user management table KT1 with using the two-dimensional code. However, instead of this, similar to the charge processing, the predetermined number of printable sheets may also be stored, in response to a user's operation of the charge icon 321 corresponding to the predetermined number of printable sheets.

In the above-described embodiment, the number of printable sheets is associated with the user ID 12b. However, instead of this, the number of printable sheets may also be associated with the service ID. According to this, since the number of printable sheets is conveniently managed with respect to the service ID, the management of the number of printable sheets becomes convenient, particularly in a case where a plurality of users uses the same service ID.

In the above-described embodiment, the user selects the desired charge icon 321 from the charge screen 300 displayed on the display 14, so that the number of charge sheets corresponding to the selected charge screen 321 is charged (added) to the number of printable sheets. However, instead of this, a configuration may also be possible in which the user can input a desired number of charge sheets, the number of charge sheets input by the user is charged to the number of printable sheets and a charging amount corresponding to the input number of charge sheets may be billed to the user by the vendor. In addition, the printing system is not limited to the configuration of charging sheets, and may also be configured to charge points or to charge an amount of ink. In this case, for example, a point or an amount of ink may be calculated per one printing, according to one-side printing or duplex printing, an amount of ink used with print data or the like, and a count may be performed from the charged point or amount of ink.

Further, the technical elements described in the present specification or the drawings provide the technical availability either independently or through various combinations, and are not limited to combinations defined in the claims at the time of filing the application. Further, the technology described in the present specification or the drawings accomplishes a plurality of purposes at the same time, and accomplishing any one of the purposes provides the technical availability.

What is claimed is:

1. A non-transitory computer-readable storage medium storing a computer program, when executed by a computer of an information processing device capable of communicating with a printer comprising a printing unit configured to carry out printing on a sheet with using a colorant, and a server comprising a server memory unit configured to store user identification information for identifying a user and a print-permitted amount of printing permitted for the user in association with the user identification information, the computer program being configured to cause the information processing device to perform:

first display processing of displaying, on a display unit of the information processing device, a selection screen for prompting a user to select a printing amount; and addition processing of, in response to a user's operation of the selection screen displayed in the first display processing to select a predetermined printing amount, causing the server to add the selected printing amount to the print-permitted amount associated with the user identification information of the user, wherein the computer program is configured to cause the information processing device to perform the first display processing to display, on the display unit, a first operation icon indicative of the printing amount arranged in the selection screen, and the computer program is configured to cause the information processing device to perform the addition processing to cause the server to add the printing amount indicated in the first operation icon to the print-permitted amount associated with the user identification information of the user, in response to a user's operation of the first operation icon displayed in the first display processing.

2. The non-transitory computer-readable storage medium according to claim 1, wherein the computer program is configured to cause the information processing device to further perform print processing of transmitting print data for printing in the printer and the user identification information to the printer, and causing the printer to carry out printing based on the print data.

3. The non-transitory computer-readable storage medium according to claim 2, wherein the computer program is configured to cause the information processing device to perform the print processing of specifying a printing amount of the printing to cause the printer to carry out the printing.

4. The non-transitory computer-readable storage medium according to claim 3, wherein the computer program is configured to cause the information processing device to perform the print processing of causing the printer to carry out the printing in a case where the print-permitted amount stored in the server memory unit is equal to or larger than the specified printing amount.

5. The non-transitory computer-readable storage medium according to claim 3, wherein the printer further comprises:
a controller configured to add up a print-completed amount of the printing which the printing unit carries out while the printer is unable to communicate with the server; and
a printer memory unit configured to store the print-completed amount added up by the controller, and
the computer program is configured to cause the information processing device to perform the print processing of, in a case where the printer and the server are unable to communicate each other, causing the printer to carry out the printing as far as the specified printing amount is equal to or less than a printing amount obtained by subtracting the print-completed amount stored in the printer memory unit from the print-permitted amount stored in the server memory unit.

6. A non-transitory computer-readable storage medium storing a computer program, when executed by a computer of an information processing device capable of communicating with a printer comprising a printing unit configured to carry out printing on a sheet with using a colorant, and a server comprising a server memory unit configured to store user identification information for identifying a user and a print-permitted amount of printing permitted for the user in association with the user identification information, the computer program being configured to cause the information processing device to perform;
first display processing of displaying, on a display unit of the information processing device, a selection screen for prompting a user to select a printing amount; and
addition processing of, in response to a user's operation of the selection screen displayed in the first display processing to select a predetermined printing amount, causing the server to add the selected printing amount to the print-permitted amount associated with the user identification information of the user,
wherein the computer program is configured to cause the information processing device to further perform notification processing of, in a case where a level of the colorant is equal to or less than a predetermined level, issuing a notification of prompting replacement of the printer.

7. The non-transitory computer-readable storage medium according to claim 6,
wherein the server memory unit is further configured to store printer replacement information in association with the printer, the printer replacement information indicating whether or not the associated printer is replaced and indicating the associated printer is a printer already replaced or a printer not replaced yet, and
the printer is restricted from carrying out the printing in a case where the printer replacement information stored in the server memory unit indicates that the associated printer is the printer already replaced.

8. A non-transitory computer-readable storage medium storing a computer program, when executed by a computer of an information processing device capable of communicating with a printer comprising a printing unit configured to carry out printing on a sheet with using a colorant, and a server comprising a server memory unit configured to store user identification information for identifying a user and a print-permitted amount of printing permitted for the user in association with the user identification information, the computer program being configured to cause the information processing device to perform;
first display processing of displaying, on a display unit of the information processing device, a selection screen for prompting a user to select a printing amount; and
addition processing of, in response to a user's operation of the selection screen displayed in the first display processing to select a predetermined printing amount, causing the server to add the selected printing amount to the print-permitted amount associated with the user identification information of the user,
wherein the computer program is configured to cause the information processing device to further perform:
second display processing of displaying, on the display unit, an operation icon for requesting replacement of the printer; and
replacement applying processing of, in response to a user's operation of the operation icon displayed in the second display processing, transmitting a request for replacement of the printer to a vendor that provides a printing service.

9. The non-transitory computer-readable storage medium according to claim 8,
wherein the server memory unit is further configured to:
store service identification information for identifying the printing service, in association with the printer;
store service identification information, which is identical to service identification information associated with a printer to be replaced with a new printer, in association with the new printer.

10. The non-transitory computer-readable storage medium according to claim 8,
wherein the server memory unit is further configured to store activation information in association with the printer, the activation information indicating that the printing unit is permitted to carry out the printing in a case where the activation information is set to an ON state and the printing unit is restricted from carrying out the printing in a case where the activation information is set to an OFF state, and
the activation information is set to the ON state only for the one printer with respect to the one printing service.

11. The non-transitory computer-readable storage medium according to claim 8,
wherein the server memory unit is further configured to store printer replacement information in association with the printer, the printer replacement information indicating whether or not the associated printer is replaced and indicating the associated printer is a printer already replaced or a printer not replaced yet, and
the printer is restricted from carrying out the printing in a case where the printer replacement information stored in the server memory unit indicates that the associated printer is the printer already replaced.

12. A non-transitory computer-readable storage medium storing a computer program, when executed by a computer of an information processing device capable of communicating with a printer comprising a printing unit configured to carry out printing on a sheet with using a colorant, and a server comprising a server memory unit configured to store user identification information for identifying a user and a print-permitted amount of printing permitted for the user in association with the user identification information, the computer program being configured to cause the information processing device to perform;

first display processing of displaying, on a display unit of the information processing device, a selection screen for prompting a user to select a printing amount; and addition processing of, in response to a user's operation of the selection screen displayed in the first display processing to select a predetermined printing amount, causing the server to add the selected printing amount to the print-permitted amount associated with the user identification information of the user, wherein the printer is configured to be impossible for the user to replenish with the colorant.

* * * * *